US005798054A

United States Patent [19]
Sato et al.

[11] Patent Number: 5,798,054
[45] Date of Patent: Aug. 25, 1998

[54] LUBRICANT AND COMBINATION LUBRICANT AND REFRIGERANT COMPOSITION

[75] Inventors: Takehisa Sato; Hironari Ueda; Toshiaki Kuribayashi; Satoshi Asano; Tadashi Niwa; Hiroshi Ueno; Takeaki Fujii; Sadakatsu Suzuki, all of Saitama, Japan

[73] Assignee: Exxon Chemical Patents Inc., Houston, Tex.

[21] Appl. No.: 723,038

[22] Filed: Sep. 30, 1996

Related U.S. Application Data

[63] Continuation-in-part of Ser. No. 476,066, Jun. 7, 1995, abandoned, which is a continuation of Ser. No. 107,853, filed as PCT/JP92/01707, Dec. 25, 1992, abandoned.

[30] Foreign Application Priority Data

| Dec. 26, 1991 | [JP] | Japan | 3/344484 |
| Jan. 21, 1992 | [JP] | Japan | 4-29013 |
| Oct. 1, 1992 | [JP] | Japan | 4/284896 |
| Oct. 6, 1992 | [JP] | Japan | 4/290960 |
| Oct. 7, 1992 | [JP] | Japan | 4/291916 |
| Oct. 7, 1992 | [JP] | Japan | 4/291917 |
| Oct. 7, 1992 | [JP] | Japan | 4/291918 |

[51] Int. Cl.$^6$ ................ C09K 5/04; C10M 145/16

[52] U.S. Cl. ................ 252/68; 508/466; 508/468; 508/496

[58] Field of Search ............ 252/68; 508/466, 508/468, 496; 560/190; 526/318.4, 318.43, 318.3

[56] References Cited

U.S. PATENT DOCUMENTS

| 2,460,035 | 1/1949 | Rogers et al. | 560/190 |
| 5,176,841 | 1/1993 | Wallfahrer et al. | 508/496 |

FOREIGN PATENT DOCUMENTS 365081    4/1990    European Pat. Off. .

*Primary Examiner*—Alan Diamond
*Attorney, Agent, or Firm*—Richard D. Jordan

[57] ABSTRACT

A lubricant and combination lubricant and refrigerant composition for use in a refrigerating machine in which a substitute freon refrigerant, which lubricant contains a polymer of a fumaric ester or a fumaric ester and a copolymerizable alkylene, and optionally contains an organic carboxylic ester or a polyalkylene glycol with a kinematic viscosity of 2 to 30 cSt. The lubricant is compatible with substitute freon refrigerants such as hydrogen-containing halogenated hydrocarbons, particularly R 134a, in a wide temperature range, has a high viscosity index, is thermally and chemically stable, and has an excellent lubricity.

8 Claims, 4 Drawing Sheets

LUBRICANT AND COMBINATION LUBRICANT AND REFRIGERANT COMPOSITION

This is a continuation-in-part of U.S. application Ser. No. 08/476,066, filed Jun. 7, 1995 now abandoned, which is a continuation of U.S. application Ser. No. 08/107,853, filed Sep. 30, 1993 now abandoned, which is a 371 of PCT/JP92/01707 filed Dec. 25, 1992.

FIELD OF THE INVENTION

The present invention relates to a lubricant and a combination lubricant and refrigerant composition for use in a refrigerating machine in which a substitute freon refrigerant is used, more specifically a lubricant for a refrigerating machine in which a hydrogen-containing halogenated hydrocarbon refrigerant is used. A particularly preferred lubricant of the present invention is a fumaric ester copolymer.

BACKGROUND OF THE INVENTION

Freon type refrigerants such as R11 ($CCl_3F$) and R12 ($CCl_2F_2$) have been used as refrigerants in refrigerating machines such as air conditioners in buildings, refrigerators and household air conditioners. However, these freons, in which all hydrogen atoms in hydrocarbons are replaced with halogen atoms such as chlorine atoms, cause destruction of the ozone layer in the stratosphere and, therefore, are subject to worldwide restrictions. Accordingly, substitute freon refrigerants which are not apt to destroy the ozone layer have been developed, such as hydrogen-containing halogenated hydrocarbon refrigerants, for instance, R22 ($CHClF_2$), R123 ($CF_3CHCl_2$), R141b ($CCl_2FCH_3$), R134a ($CF_3CH_2F$), R152a ($CHF_2CH_3$), and so on. Among these, non-chlorine halogenated hydrocarbons such as R134a ($CF_3CH_2F$), R152a ($CHF_2CH_3$), R125 ($CHF_2CF_3$), R32 ($CH_2F_2$) and mixtures thereof are thought to be promising.

Lubricants for refrigerating machines are requested to meet the following requirements: they are compatible with a refrigerant in a wide range of temperature (compatibility), that is to say, there is no cloudiness at high temperatures (large solvation of the lubricants with a refrigerant); lubricants have large molecular polarity; and lubricants do not precipitate at low temperatures (large solubility of the lubricants in refrigerants). Further, there are different kinematic viscosity ranges suitable to different refrigerating machines. Therefore, each lubricant needs to have such a kinematic viscosity corresponding to each machine.

Naphthenic mineral oils, paraffinic mineral oils, alkyl benzenes, polyglycolic mineral oils and ester oils are used as lubricants for previous freon refrigerants. They are however scarcely compatible with the aforesaid substitute freon refrigerants and, therefore, cannot be used. Accordingly, lubricants of polyalkylene glycol type or polyolpolyester type have been developed. For instance, there are known Ucon LB-165 and Ucon LB-525 (trade marks, Union Carbide) comprising polyaklylene glycol which are known to be compatible with Freon 134a. There are also known high viscosity compositions for refrigerating machines on the base of polyoxypropyleneglycol monobutyl ether (Japan Patent Publication Sho-57-42119/82). Polyoxyalkyleneglycol having at least two hydroxyl groups in molecule is proposed (U.S. Pat. No. 4,755,316). There are known glycidylmethyl ether-propyleneoxide copolymers, or glycidylmethyl ether polymers of which the terminal groups are a methoxy group and a hydroxyl group as a lubricant for refrigerating machines (Japanese Patent Application Laid-Open Hei-3-205492/91).

However, high kinematic viscosity products of all of these have poor compatibility with substitute freons. Further, polyalkyleneglycol type lubricants show high hygroscopisity and, therefore, may cause a problem of generation of rust.

DISCLOSURE OF THE INVENTION

The object of the present invention is therefore to provide a lubricant suitable for use with substitute freon refrigerants of the hydrogen-containing halogenated hydrocarbon type, particularly suitable for use with to non-chlorine halogenated hydrocarbon refrigerants, and to provide a composition containing lubricant and refrigerant.

The present invention is a lubricant for use with a refrigerating machine, characterized in that it comprises a fumaric ester polymer composed mainly of a recurring unit represented by the following general formula (I) and, optionally, a recurring unit represented by the following general formula (II):

wherein $R_1$ may be same as or different from one another and are selected from the group consisting of linear or branched $C_1$ to $C_9$ alkyl groups, aryl groups and terminal-substituted or -unsubstituted polyalkylene oxide radicals; and $R_2$ may be same as or different from one another and are selected from the group consisting of alkylene groups and substituted alkylene groups, provided that in the polymer the number of the recurring unit (I) contained is at least two and is equal to or larger than the number of the recurring unit (II), and the recurring unit (II) may or may not be contained. Units (I) and (II) may form a random copolymer or block copolymer.

BEST MODE TO EMBODY THE INVENTION

Figure 1:
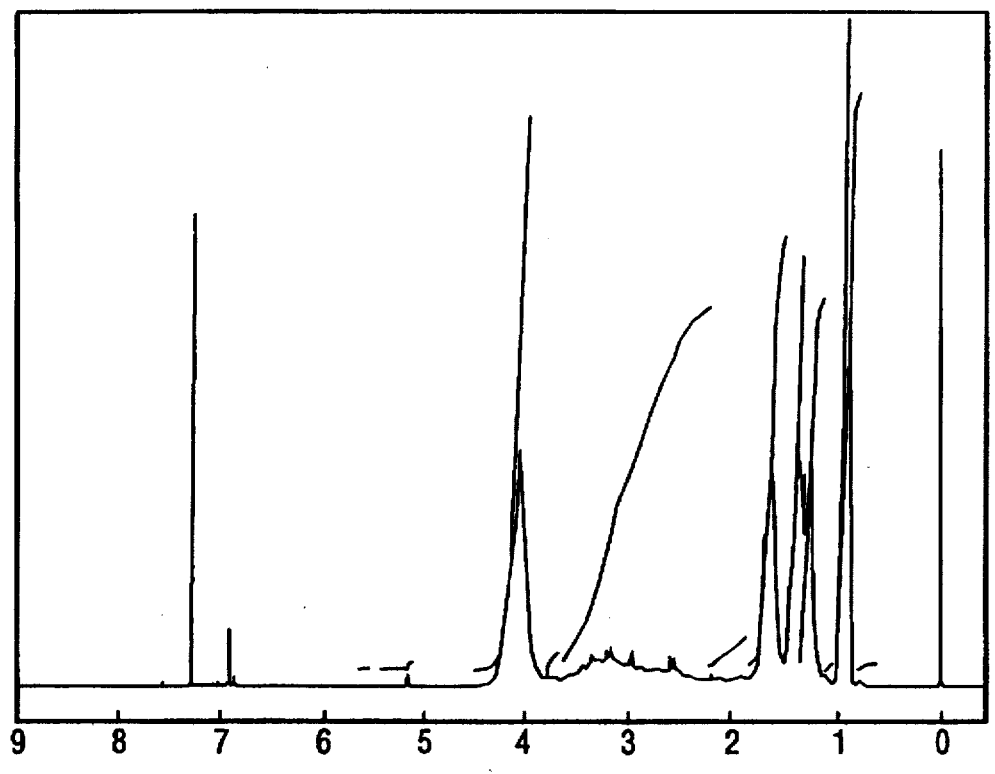
FIG. 1 is a chart showing the results of analysis by $^1H$—NMR on the fumaric ester copolymer of the invention produced in Example 18.

The aforesaid fumaric ester polymer is a polymerization product of fumaric acid ester, or fumaric acid ester and copolymerizable alkylene, which has radicals derived from a polymerization initiator used in polymerization at the both terminals.

In the general formula (I), $R_1$ is a linear or branched $C_1$ to $C_9$ alkyl group (including an aralkyl group), preferably $C_1$ to $C_6$ alkyl group; an aryl group (including an alkaryl group), preferably a phenyl group or a cresyl group; or a terminal substituted or unsubstituted polyalkylene oxide radicals, preferably those represented by the formula —(AO)$_x$—X, wherein A is an ethylene, propylene or butylene group, X is a hydrogen atom or a $C_1$ to $C_4$ alkyl group and x is an integer of 1 to 4, particularly those having 4 to 6 carbon atoms excluding the carbon atoms of the terminal group X (as the compatibility with a refrigerant decreases with the increasing number of the carbon atoms), such as a diethyleneglycol monoethyl ether radical and an ethyleneglycol monoethyl ether radical.

Particularly, polymers in which $R_1$ is a butyl group or a combination of a butyl group and an ethyl group at a ratio of 8:2 or larger and at least eight recurring units (I) are present have well-balanced properties among viscosity, viscosity index and compatibility with a refrigerant.

In the general formula (II), $R_2$ is a substituted or unsubstituted alkylene group (including an aralkyl group), preferably $C_2$ to $C_{12}$ linear or branched ones or those substituted with a cycloalkylene or oxoalkylene group, particularly ethylene, propylene, butene and styrenic groups. The viscosity index is improved by the introduction of the recurring unit (II) into the polymer. However, a larger number of the recurring unit (II) than the number of the recurring unit (I) should not exist in the polymer. That is to say, the proportion of the recurring unit (II) in the copolymer is at most 50 mol percent, preferably at most 30 mol percent. If it exceeds 50 mol percent, compatibility of the copolymer with a refrigerant will worsen.

The degree of polymerization of the fumaric ester polymer is selected so that it has a kinematic viscosity suitable for use as a lubricant for refrigerating machines as will be discussed below. The kinematic viscosity ranges preferably from to 2 to 100 cSt at 100° C. The number average molecular weight is preferably 400 to 3,000, more preferably 400 to 1,600. As the molecular weight becomes larger, viscosity index improves, but the polymer becomes solid easily at room temperature and its compatibility with a refrigerant tends to worsen. It is possible to use a single fumaric ester copolymer. Alternatively, it is also possible to use two or more kinds of copolymer which have different structures, molecular weights and so on. For instance, a fumaric ester copolymer of molecular weight of 400 to 3,000 and a fumaric ester polymer of a molecular weight of 3,000 to 10,000 is preferred.

The fumaric ester polymer is obtained by polymerizing a monomer corresponding to the aforesaid recurring unit (I) and optionally a monomer corresponding to recurring unit (II) in the presence of a polymerization initiator under heating to reflux. When procedures start with a corresponding maleic acid alkyl ester, a catalyst for isomerization is further added. With the addition of a catalyst for isomerization, it is believed that maleic ester is first isomerized into fumaric ester, which polymerizes then (Acta Polymerica 39 (1988) No. 1, 5–8). The catalyst for isomerization may be added to a polymerization reaction system in a mol ratio to a starting ester of 1/27 to 1/2700. Except this, polymerization may be carried out similarly as in the aforesaid case of fumaric ester. As the catalyst for isomerization can be conventional, morpholine, piperidine, dipropylamine and propylamine with morpholine are preferred.

Known polymerization initiators may be used in the present polymerization reaction, such as azonitrile compounds, e.g., 2,2'-azobisisobutyronitrile, 1,1'-azobis (cyclohexane carbonitrile), 2,2'-azobis(4-methoxy-2,4-dimethyl valeronitrile), and 2,2'-azobis(2,4-dimethyl valeronitrile); azoamidine compounds such as 2,2'-azobis(2-methyl-N-phenyl propioneamidine), 2,2'-azobis(2-methyl propioneamidine) dihydrochloride, and 2,2'-azobis[2-(2-imidazoline-2-yl)propane]dihydrochloride; azoamide compounds such as 2,2'-azobis(isobutylamide)dihydrochloride, and 2,2'azobis{2-methyl-N-[1,1-bis(hydroxymethyl)-2-hydroxyethyl]propioneamide} alkylazo compounds such as azodi-tert-octane, azodi-tert-butane, and dimethyl-2,2'-azobisisobutylate. Organic peroxides may also be used, such as ketone peroxides, e.g., methyl ethyl ketone peroxide, cyclohexanone peroxide, and methyl cyclohexanone peroxide; peroxyketals such as 1,1-bis(tert-butyl peroxy)-3,3,5-trimethyl cyclohexane, 1,1-bis(tert-butylperoxy) cyclohexane, and 2,2-bis(tert-butylperoxy)butane; hydroperoxides such as tert-butyl hydroperoxide, and di-isopropylbenzene hydroperoxide; dialkyl peroxides such as di-tert-butyl peroxide, di-cumyl peroxide, and tert-butyl cumyl peroxide; diacyl peroxides such as acetyl peroxide, isobutyryl peroxide, and benzoyl peroxide; peroxydicarbonates such as di-isopropyl peroxydicarbonate, di-n-propyl dicarbonate, and di-methoxy isopropyl peroxydicarbonate; peroxyesters such as tert-butyl peroxyacetate, tert-butyl peroxyisobutyrate, cumyl peroxyneodecanoate, tert-butyl peroxybenzoate, and tert-hexyl peroxyneodecanoate. The polymerization initiators are, however, not limited to these. Preferred are 2,2'-azobisisobutyronitrile, 1,1'-azobis (cyclohexane-1-carbonitrile), tert-butyl peroxides, and di-tert-butyl peroxides. Most preferred are tert-butyl peroxides.

The polymerization initiator is preferably used in a mole ratio to the raw material of at least 1/100, particularly at least 3/100. If the amount is too large, any additional effect is not attained. Usually, the mole ratio is at most 2/10.

In order to improve yield, it is preferred not to add the polymerization initiator to the polymerization reaction system at one time, but to add it batchwise or continuously. The polymerization temperature is preferably 50° to 180° C. particularly 80° to 160° C. It is preferred to continue stirring under reflux while maintaining the temperature at the aforesaid level, after the whole amount of the polymerization initiator is added. Preferably, it takes 6 to 72 hours, particularly 10 to 30 hours, from the start of the addition of the initiator to the termination of the polymerization reaction.

Solvents may further be added in the polymerization reaction system. The amount of the solvents is preferably such that the concentration of the starting ester is at least 10% by weight. As the solvents, those which are generally used in radical polymerization may be used here, such as methyl ethyl ketone, methyl isobutyl ketone, cyclohexanone, p-xylene, o-xylene, benzene, toluene and tetrahydrofuran.

Particularly Preferred Embodiment (A)

A particularly preferred lubricant for use with a refrigerant with a refrigerating machine according to the invention comprises a fumaric acid alkyl ester copolymer which is composed of 1 to 50 mol % of a structural unit represented by formula (III):

$$-CH-CH-$$
$$\phantom{-}|\phantom{CH-}|$$
$$COOC_2H_5 \phantom{-} COOC_2H_5 \quad (III)$$

and 50 to 99 mol % of a structural unit represented by formula (IV):

$$-CH-CH-$$
$$\phantom{-}|\phantom{CH-}|$$
$$COOR \phantom{-} COOR \quad (IV)$$

wherein each R independently represents a linear or branched alkyl group having 3 to 8 carbon atoms.

Other copolymerizable components such as recurring unit (II) may be contained in an amount of 20 mole % or less. Such copolymerizable components include ethylene, butene and styrenes.

That is to say, in this preferred polymer, the aforesaid recurring unit (I) consists of 1 to 50 mol % of the recurring unit in which $R_1$ is an ethyl group and 50 to 99 mol % of the recurring unit in which $R_1$ is a linear or branched $C_3$–$C_8$ alkyl group, and the recurring unit (II) constitutes 0 to 20 mol % of the whole copolymer components.

R in formula (IV) includes propyl, butyl, pentyl, hexyl, heptyl and octyl groups and their structural isomers, which may be linear or branched. R is preferably a n-butyl group. R's may be same as or different from one another. If the amount of the structural unit represented by formula (III) exceeds 50 mol %, that is, if the unit derived from diethyl fumarate exceeds the unit derived from fumaric acid dialkyl ester in number, a viscosity index will decrease extremely. The copolymer may be any type of copolymers such as random copolymers or block copolymers.

Such a fumaric acid alkyl ester copolymer may be prepared, for instance, as follows: First, the starting materials, i.e., diethyl fumarate and fumaric acid alkyl ester, are blended so that a ratio of diethyl fumarate is 50 mol % or less. The corresponding diethyl maleate or maleic acid alkyl ester may also be used as the starting materials, because it is known that polymerization of fumaric acid esters may cause after isomerization of maleic esters (Acta Polymerica, 39(1988) No. 1, 5–8). Then, the subsequent polymerization procedures may be carried out as stated above.

It is possible to use fumaric esters having different structural units, such as other fumaric esters represented by the aforesaid formulae (I) and (II) together with the fumaric ester copolymer of this preferred embodiment.

Particularly Preferred Embodiment (B)

In another particularly preferred embodiment, a lubricant for use with a refrigerant in a refrigerating machine according to the invention comprises a fumaric ester copolymer which is characterized in that it is composed of 5 to 45 mol % of a structural unit represented by the following formula (V) and 95 to 55 mol % of a structural unit represented by the following formula (VI) and it has a molecular weight of 800 to 3,000:

$$-CH-CH-$$
$$\phantom{-}|\phantom{CH-}|$$
$$COOC_2H_5 \phantom{-} COOC_2H_5 \quad (V)$$

$$-CH-CH-$$
$$\phantom{-}|\phantom{CH-}|$$
$$COOC_4H_9 \phantom{-} COOC_4H_9 \quad (VI)$$

That is to say, in this preferred copolymer, the aforesaid recurring unit (I) is composed of 5 to 45 mol % of the recurring unit in which $R_1$ is an ethyl group and 95 to 55 mol % of the recurring unit in which $R_1$ is a linear or branched butyl group, and the recurring unit (II) is not incorporated.

The group $C_4H_9$ in formula (VI) includes all structural isomers such as n-butyl, sec-butyl, tert-butyl and isobutyl. The ratio of the structural unit (V) is 5 to 45 mol %, preferably 6 to 39 mol %. The ratio of the structural unit (VI) is 95 to 55 mol %, preferably 94 to 61 mol %. The copolymer may be any type of copolymers such as random copolymers or block copolymers.

Such a fumaric ester copolymer may be prepared, for instance, as follows: First, the starting materials, i.e., diethyl fumarate and dibutyl fumarate, are blended so that their proportion falls under the aforesaid ratio of the structural units. Diethyl maleate and dibutyl maleate can be used as the starting materials. Then, the starting materials are polymerized in the presence of a polymerization initiator as stated above.

This fumaric ester copolymer preferably has a viscosity index of 100 to 200.

It is possible to use fumaric esters having different structural units, such as other fumaric esters represented by the aforesaid formulae (I) and (II), or (III) and (IV).

Other Lubricant Components

In addition to the aforesaid fumaric ester polymer, any known lubricant components such as organic carboxylic esters, polyalkylene glycols, alkyl benzenes and mineral oils may be mixed in desired proportions with the lubricant of the invention in order to adjust its kinematic viscosity and viscosity index. This is particularly desirable for use in different types of refrigerating machines. A particularly preferred lubricant according to the invention contains an organic carboxylic ester and/or polyalkylene glycol having a kinematic viscosity of 2 to 30 cSt at a temperature of 100° C. in combination with the aforesaid fumaric ester copolymer. The organic carboxylic ester and/or polyalkylene glycol are preferably blended in an amount of 80 parts by weight or less per 20 parts by weight of the fumaric ester polymer. If the amount of the organic carboxylic ester and/or polyalkylene glycol is too large, the compatibility at high temperatures tends to worsen or the viscosity tends to decrease.

Examples of the organic carboxylic ester include those which have high molecular polarity, for instance, such as follows:

(1) First, polyol esters from aliphatic polyhydric alcohol and linear or branched fatty acid may be used.

Examples of the aliphatic polyhydric alcohols to prepare the polyol esters include trimethylolpropane, ditrimethylolpropane, trimethylolethane, ditrimethylolethane, pentaerythritol, dipentaerythritol and tripentaerythritol. As the fatty acid, those having 3 to 12 carbon atoms are preferred. Preferred Examples include propionic acid, butyric acid, valeric acid, hexanoic acid, heptanoic acid, octanoic acid, nonanoic acid, decanoic acid, undecanoic acid, dodecanoic acid, isovaleric acid, neopentanoic acid, 2-methyl butyric acid, 2-ethyl butyric acid, 2-methyl hexanoic acid, 2-ethyl hexanoic acid, isooctanoic acid, isononanoic acid, isodecanoic acid, 2,2'-dimethyl octanoic acid, and 2-butyl octanoic acid.

Examples of preferred polyesters from the aforesaid aliphatic polyhydric alcohols and fatty acids are ester oils, particularly, from pentaerythritol, dipentaerythritol, tripentaerythritol or a mixture thereof and a fatty acid having 5 to 12 carbon atoms, more preferably 5 to 7 carbon atoms, such as valeric acid, hexanoic acid, heptanoic acid, 2-methyl hexanoic acid, 2-ethyl hexanoic acid, isooctanoic acid, isononanoic acid, isodecanoic acid, 2,2'-dimethyl octanoic acid, 2-butyl octanoic acid or a mixture thereof. These can have improved compatibility with a refrigerant, particularly, at low temperatures.

Partial esters from aliphatic polyhydric alcohols and linear or branched fatty acids may also be used. The polyhydric alcohols used here may be the aforesaid ones. Preferred fatty acids here are those having 3 to 9 carbon atoms, such as propionic acid, butyric acid, valeric acid, hexanoic acid, heptanoic acid, octanoic acid, nonanoic acid, 2-methyl hexanoic acid, 2-ethyl hexanoic acid; isooctanoic acid, and isononanoic acid. These partial esters may be prepared by reacting the aliphatic polyhydric alcohol with the fatty acid in a properly adjusted reaction mole ratio.

(2) Use may be made of diesters from neopentyl glycol as an aliphatic polyhydric alcohol and a linear or branched fatty acid having 6 to 9 carbon atoms such as hexanoic acid, heptanoic acid, octanoic acid, nonanoic acid, 2-ethyl butyric acid, 2-methyl hexanoic acid, 2-ethyl hexanoic acid, isooctanoic acid and isononanoic acid.

(3) It is also possible to use complex esters from partial esters reduced from an aliphatic polyhydric alcohol and a linear or branched fatty acid having 3 to 12 carbon atoms, and a linear or branched aliphatic dibasic acid and/or aromatic polybasic acid.

The aliphatic polyhydric alcohol which may be used here includes trimethylolpropane, trimethylolethane, pentaerythritol and dipentaerythritol.

The linear or branched fatty acid which has 3 to 12 carbon atoms and may be used here includes propionic acid, butyric acid, isobutyric acid, valeric acid, isovaleric acid, hexanoic acid, heptanoic acid, octanoic acid, nonanoic acid, decanoic acid, dodecanoic acid, 2-methyl butyric acid, 2-ethyl butyric acid, 2-methyl hexanoic acid, 2-ethyl hexanoic acid, isooctanoic acid, isononanoic acid, isodecanoic acid, 2,2'-dimethyl octanoic acid, and 2-butyl octanoic acid.

When a fatty acid having 5 to 7 carbon atoms, particularly 5 to 6 carbon atoms, is used in the complex esters, the resultant ester oils can have improved compatibility with a refrigerant, particularly, at low temperatures. Isovaleric acid, valeric acid, hexanoic acid, 2-methyl butyric acid, 2-ethyl butyric acid or a mixture thereof may be used as such a fatty acid. Preference is given to a mixture of a $C_5$ fatty acid and a $C_6$ fatty acid in a weight ratio ranging from 10:90 to 9:10.

Examples of the aliphatic dibasic acid which may be used to esterify the polyhydric alcohol together with the above fatty acid include succinic acid, glutaric acid, adipic acid, pimelic acid, suberic acid, azelaic acid, sebacic acid, undecanedioic acid, dodecanedioic acid, tridecanedioic acid, carboxyoctadecanoic acid, carboxymethyloctadecanoic acid, and eicosanedioic acid. Examples of the aromatic dibasic acid include phthalic acid and isophthalic acid. The aromatic tribaic acid includes trimellitic acid, and the aromatic tetrabasic acid includes pyromellitic acid.

A mole ratio of the fatty acid to the aliphatic dibasic acid and/or the aromatic polybasic acid may preferably be 6/1. In the esterification reaction, these acids (i.e., fatty acids, and aliphatic or aromatic polybasic acids) may preferably be used in a ratio of the total of these to the polyhydric alcohol of 7/1.

In the esterification reaction, the polyhydric alcohol is reacted with the aliphatic dibasic acid and/or aromatic polybasic acid in a predetermined ratio to obtain a partial ester, which is then reacted with the fatty acid. The above order of the reactions may be reversed. Alternatively, the acids are mixed together and subjected to the esterification.

(4) Dialkyl esters (with 16 to 22 carbon atoms) from a linear or branched aliphatic dibasic acid may be used.

The aliphatic dibasic acid mentioned in (3) above may also be used here as the aliphatic dibasic acid. Preferred examples of the aliphatic dibasic acid include succinic acid, adipic acid, sebacic acid, undecanedioic acid, dodecanedioic acid, carboxyoctadecanoic acid and carboxymethyloctadecanoic acid. Alcohols having 5 to 8 carbon atoms may be used as the alkyl alcohol component, such as amyl alcohol, hexyl alcohol, heptyl alcohol and octyl alcohol as well as isomers thereof Isoamyl alcohol, isohexyl alcohol and octyl alcohol are preferred. More specifically, dioctyl adipate, diisoheptyl adipate, dihexyl sebacate and diheptyl succinate may be named.

(5) Dialkyl esters (with 18 to 26 carbon atoms) of aromatic dibasic acids may also be used.

Examples of the aromatic dibasic acids include phthalic acid, isophthalic acid, and derivatives thereof As the alkyl alcohol component, the alcohols with 5 to 8 carbon atoms which are mentioned in (4) above may be used. Preferred alcohols are isoamyl alcohol, isoheptyl alcohol and octyl alcohol. Examples of the diesters include dioctyl phthalate, diisoheptyl phthalate and diisoamyl phthalate.

(6) Use may be made of organic carboxylic eaters in which an alcoholic component is an addition product of 1 to 10 moles, preferably 1 to 6 moles, of alkylene oxide selected from, for instance, ethylene oxide, propylene oxide, butylene oxide, amylene oxide and their isomers with monohydric alcohol selected from methanol, ethanol, propanol, butanol, etc., and their isomers or with polyhydric alcohol such as glycerine and trimethylolpropane.

As an acid which is to react with the alkylene oxide addition product of monohydric alcohol, use may be made of the aliphatic dibasic acids and the aromatic polybasic acids mentioned in (3) above. As an acid which is to react with the alkylene oxide addition product of polyhydric alcohol, use may be made of the $C_3$ to $C_{12}$ linear or branched fatty acids mentioned in (1) above.

Either linear or branched fatty acid may be used as the fatty acid to constitute the aforesaid organic carboxylic ester. However, the use of the branched fatty acid may attain better stability to hydrolysis and may offer suitability to hermetic coils.

These organic carboxylic esters may be prepared by esterification of the alcohols with the fatty acids in the presence of acid catalyst such as phosphoric acid. Usually, these are obtained with a total acid value of 0.1 to 0.5 mg KOH/g, a peroxide value of 0.1 to 5 meq./kg, an aldehyde value of 0.1 to 5 mg KOH/g, a bromine number of 1 to 100 mg/100 g, an ash content of 5 to 50 ppm and a water content of 300 to 1,000 ppm.

However, when the total acid value in a refrigerating machine lubricant is high, metallic parts may suffer from corrosion and, further, a refrigerating machine oil may be hydrolized to deteriorate its performance as a refrigerating machine oil. In addition, a motor-unit is usually located in a lubricant in refrigerators, which requires high level of insulation. Accordingly, preferred is a refrigerating machine lubricant having a total acid value of 0.05 mg KOH/g or less.

Further, it is preferred to keep the peroxide value, the aldehyde value and the bromine number low for high refrigerant stability, to lower the ash content for prevention of formation of sludge, and also to decrease the water content for better hydrolysis stability and insulation. To this end the aforesaid esters obtained In usual esterification reaction may be purified so that indices reflecting the above-mentioned properties of ester oils fall in a range suitable to a refrigerating machine oil, so that a better refrigerating machine oil is obtained.

The purification of the organic carboxylic acid esters may be conducted by contact with silica gel, active alumina, active carbon, zeolite or the like. The contacting conditions may be chosen properly in each case, but the temperature is preferably 100° C. or lower.

The polyalkylene glycol which can be used in the invention includes homopolymers of alkylene glycol such as polyethylene glycol and polypropylene glycol, copolymers of alkylene oxides such as ethylene oxide and propylene oxide. Their terminal groups may be substituted with a methyl group, an ethyl group, a propyl group, a butyl group and so on. The average molecular weight is generally 500 to 1,800, preferably 800 to 1,600. If it is less than 500, the compatibility with a refrigerant at high temperatures is high, but the kinematic viscosity is low and the heat stability tends to decrease. Meanwhile, if it exceeds 1,800, the kinematic viscosity is high, but the compatibility with a refrigerant tends to lower.

An agent for improving viscosity index may be added to the refrigerating machine oil of the invention in order to attain a desired kinematic viscosity and viscosity index. Any conventional viscosity index-improving agents may be used, such as polyolefins (e.g., polybutene, polymer-α-olefin, ethylene-α-olefin copolymers and hydrogenated products thereof), polymethacrylate (e.g., homopolymers of methacrylate or acrylate, and copolymers comprising acrylic acid or methacrylic acid component), polyisobutylene, polyalkyl styrene, ethylene-propylene copolymers, styrene-diene copolymers, and styrene-maleic anhydride ester copolymers. These viscosity index-improving agents may usually be blended in an amount of 0.1 to 20% by weight, preferably 1 to 10% by weight, based on the basic oil.

The refrigerating machine oil of the invention generally has a kinematic viscosity in a range of from 2 to 100 cSt, preferably from 2 to 80 cSt, at 100° C. If it is less than 2 cSt, the compatibility with a refrigerant at high temperatures is high, but the kinematic viscosity is so low as to damage lubricity and sealing properties. In addition, the heat stability tends to worsen. Meanwhile, if it exceeds 100 cSt, the compatibility with a refrigerant tends to decrease. However, even within this range, a kinematic viscosity range properly used differs depending upon machines used. For instance, the desirable range is 2 to 9 cSt, preferably 3 to 7 cSt, for household refrigerators; 7 to 40 cSt for car air conditioners. Among car air conditioners, the range is 7 to 15 cSt, preferably 8 to 11 cSt, for reciprocating compressors; and 25 to 40 cSt, preferably 20 to 35 cSt, for rotary compressors. If the kinematic viscosity exceeds 9 cSt in household refrigerators, friction loss at sliding parts will be too large. In car air conditioners of a reciprocating type, lubricity is insufficient with a kinematic viscosity less than 7 cSt, while friction loss at sliding parts is large with a kinematic viscosity larger than 15 cSt. In car air conditioners of a rotary type, sealing properties are poor with a kinematic viscosity less than 15 cSt.

Additives

Various conventional additives may be added in the refrigerating machine lubricant of the invention. As anti-abrasion agents, there may be named sulfur type anti-abrasion agents such as compounds represented by the general formula $(RO)_3P=S$, wherein R's may be same as or different from one another and an alkyl, aryl or phenyl group, such as trialkyl phosphorothionate, triphenyl phosphorothionate and alkyl diaryl phosphorothionate; sulfides such as diphenyl sulfide, diphenyl disulfide, di-n-butyl sulfide, di-n-butyl disulfide, di-tert-dodecyl disulfide and di-tert-dodecyl trisulfide; sulfurized fatty oils such as sulfurized palm oil and sulfurized dipentene; thiocarbonates such as xanthic disulfide; and zinc thiophosphate type anti-abrasion agents such as zinc primary alkyl thiophosphate, zinc secondary alkyl thiophosphate, alkaryl thiophosphate and zinc aryl thiophosphate. As phosphor type anti-abrasion agents, there may be named phosphoric acid esters such as benzyl diphenyl phosphate, aryl diphenyl phosphate, triphenyl phosphate, tricresyl phosphate, ethyl diphenyl phosphate, tributyl phosphate, dibutyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutylphenyl phenyl phosphate and tributylphenyl phosphate; phosphorous acid esters such as triisopropyl phosphate and diisopropyl phosphate; and hexamethyl phosphoric triamide, n-butyl-n-dioctyl phosphinate, di-n-butylhexyl phosphonate, amine dibutyl phosphonate and dibutyl phosphoroamidate.

These anti-abrasion agents may be used alone or in combination with two or more of these. The amount of the anti-abrasion agents used is usually 0.01 to 5% by weight, preferably 0.1 to 3% by weight, based on the basic oil.

Antioxidants may also be used, such as amine type antioxidants, e.g., dioctyldiphenylamine phenyl-α-naphthylamine, alkyldiphenylamine and N-nitroso diphenylamine; phenol type antioxidants such as 2,6-di-t-butyl-p-cresol, 4,4'-methylene bis(2,6-di-t-butylphenol), 2,6-di-t-butyl-α-dimethylamine p-cresol, and 2,6-di-t-butyl phenol; phosphor type antioxidants such as tris(2,4-di-t-butyl phenyl)phosphite, tris-nonylphenyl phosphite and triphenyl phosphite. These may be used each alone or in combination of two or more of these. The amount of the antioxidants used is usually 0.01 to 10% by weight, preferably 0.01 to 1.0% by weight, based on the basic oil.

Anti-corrosives may be used, such as isostearate, n-octadecyl ammonium stearate, Duomeen T dioleate, lead naphthenate, sorbitan oleate, pentaerythritol oleate, oleyl sarcosine, alkylsuccinic acid, alkenylsuccinic acid and derivatives thereof. These may be used each alone or in combination with two or more of these. The amount of anticorrosives is usually 0.001 to 1.0% by weight, preferably 0.01 to 0.5% by weight, based on the basic oil.

Antifoaming agents such as silicones may also be used usually in an amount of 0.0001 to 0.003% by weight, preferably 0.0001 to 0.001% by weight, based on the basic oil.

Metal-inactivating agents may be used, such as benzotriazole, benzotriazole derivatives, thiadiazole, thiadiazole derivatives, triazole, triazole derivatives and dithiocarbonate. These may be used each alone or in combination of two or more of these. The amount of the metal-inactivating agents used is usually 0.01 to 10% by weight, preferably 0.01 to 1.0% by weight, based on the basic oil.

Rust inhibitors may be used, such as succinic acid, succinic esters, oleic beef tallow amide, barium sulfonate, and calcium sulfonate. These may be used each alone or in combination of two or more of these. The amount of the rust inhibitors used is usually 0.01 to 10% by weight, preferably 0.01 to 1.0% by weight, based on the basic oil.

The following stabilizers may also be used in an amount of 0.1 to 20% by weight:

glycidyl ethers, such as butyl glycidyl ether, pentyl glycidyl ether, hexyl glycidyl ether, heptyl glycidyl ether, octyl glycidyl ether, nonyl glycidyl ether, 2-methylpentyl glycidyl ether, 2-ethylhexyl glycidyl ether, 3,5,5-trimethylhexyl glycidyl ether, phenyl glycidyl ether, cresyl glycidyl ether and t-butylphenyl glycidyl ether;

glycidyl esters, such as butanoic acid glycidyl ester, pentanoic acid glycidyl ester, hexanoic acid glycidyl ester, heptanoic acid glycidyl ester, octanoic acid glycidyl ester, nonanoic acid glycidyl ester, 2-methyl pentanoic acid glycidyl ester, 2-ethyl hexanoic acid glycidyl ester, 3,5,5-trimethyl hexanoic acid glycidyl ester, pivalic acid glycidyl ester and benzoic acid glycidyl ester;

Epoxidized fatty acid esters; and

Epoxy compounds, such as styrene oxide, pinene oxide, limonene oxide, 3,4-epoxy cyclohexyl methyl and 3,4-epoxy cyclohexyl carboxylate.

Preferred Polymerization Initiators

The present inventors have now found that when the fumaric ester copolymer is produced with a widely used radical polymerization initiator, 2,2'-azobisisobutyronitrile (AIBN), the fumaric ester copolymer is difficult to make up, so that precipitates may remain even after a purification step or the polymer may discolor. Its properties as a lubricant are better than those of the prior art ones, but it is desirable to improve its viscosity index and compatibility with substitute freons.

The present inventors have found that tert-butyl peroxide is preferable as a polymerization initiator for producing the fumaric acid alkyl ester polymer or copolymer. The fumaric acid alkyl ester polymer or copolymer used herein means a homopolymer or copolymer having the structural unit represented by the aforesaid formula (I), wherein R stands for a linear lower alkyl group. The copolymer may be any type of copolymers such as random copolymers and block copolymers. Examples of R include a methyl group, an ethyl group, a propyl group, a butyl group, a pentyl group and a hexyl group. R's may be same as or different from one another.

The polymerization initiator, tert-butyl peroxide, is used preferably in an amount of 0.1 to 5 mole % based on the raw materials. If the amount of the initiator is too small, the yield tends to decrease. Meanwhile, if it is too large, the kinematic viscosity tends to increase. In order to improve the yield, it is preferred to add the initiator to the polymerization reaction system batchwise or continuously, but not all at one time. The polymerization temperature is preferably 130° to 170° C. If the polymerization temperature is lower than this range, the yield tends to decrease. Meanwhile, if it is higher than this range, discoloring may occur. The reaction time is preferably 6 to 72 hours. If the reaction time is too short, the yield tends to be lower.

Preferred Polymerization Solvents

Acta Polymerica 39 (1988) No. 1, 5–8, discloses a method where fumaric acid dialkyl esters are radical-polymerized or maleic acid dialkyl esters are first isomerized, then followed by radical polymerization. According to this literature, the yield of the polymer obtained in that polymerization is low except the cases of monomers which have special alkyl groups. Particularly, the yield is low (less than 30%) in the cases of linear alkyl groups such as a n-propyl or n-butyl group as an ester moiety. The polymerization reaction was carried out in the presence of a polymerization initiator such as 2,2'-azobisisobutyronitrile in a solvent such as isopropyl alcohol.

In a polymerization reaction where a fumaric or maleic acid diester monomer is polymerized into a fumaric acid alkyl ester polymer or copolymer in the presence of a polymerization initiator, the present inventors have found that a high yield of the polymerization product is attained by conducting the polymerization in a tetrahydrofuran solvent, and the polymerization product obtained is particularly suitable as a refrigerating machine lubricant. The fumaric acid alkyl ester polymer or copolymer used herein means a homopolymer or copolymer having the structural unit represented by the aforesaid formula (I), wherein R stands for a linear lower alkyl group. The copolymer may be any type of copolymer such as random copolymers and block copolymers. Examples of R include a methyl group, an ethyl group, a propyl group, a butyl group, a pentyl group and a hexyl group. R's may be same as or different from one another.

The above-mentioned known polymerization initiators may be used here, preferably in a mole ratio of at least 1 mole per 100 moles of the raw materials. In order to improve the yield, it is preferred to add the initiator to the polymerization reaction system batchwise or continuously, but not all at one time. The polymerization temperature is preferably 60° to 145° C., and the reaction time is preferably 24 to 72 hours. If the temperature is too low or the reaction time is too short, the yield will be lower.

Tetrahydrofuran (THF) is preferably used in a volume ratio to the monomers or raw materials of 1/5 to 8. If the amount of the solvent is too small, the kinematic viscosity of the polymer is too high, so that the compatibility with a refrigerant worsens. Meanwhile if the amount is too large, the yield tends to decrease.

When fumaric or maleic diester having a linear lower alkyl group as an ester moiety is reacted in the presence of a polymerization initiator in a tetrahydrofuran solvent, the polymerization product can be obtained at a high yield. The polymerization product thus obtained is compatible with substitute freons in a wide temperature range and its viscosity index is high. This is accordingly an excellent lubricant for refrigerating machines with substitute freon refrigerants.

Alternatively, p-xylene may preferably be used as a solvent similarly as above, which has now been found by the present inventors. The polymerization product obtained has a high viscosity index and is compatible with substitute freon refrigerants in a wide temperature range.

Manner of Addition of A Radical Polymerization Initiator

The present inventors have found that the yield of the polymerization reaction product can be improved by adding a radical polymerization initiator in a specific manner. That is, in a process for the preparation of a polymer by polymerizing fumaric dialkyl ester or maleic dialkyl ester in the presence of a radical polymerization initiator, the radical polymerization initiator is preferably added batchwise in at least four times or continuously over an addition time of at least 2 hours, provided that more than two thirds of the total amount of the radical polymerization initiator should not be added in any one fifth period of the addition time.

The total amount of the radical polymerization initiator (hereinafter referred to as "initiator" for simplicity) is preferably at least 1 mole, particularly at least 3 moles, per 100 moles of the starting ester. Even if the total amount is larger, no particular advantage is obtained. Usually, the mole ratio is 2/10 or less.

This invention is characterized in that the initiator is added batchwise or continuously, but not in one time, whereby the yield can be made preferably at least 70%, particularly 80 to 100%.

The addition of the initiator is carried out over a period of at least 2 hours, preferably 3 to 12 hours. The total amount of the initiator is added batchwise in at least four times, preferably in at least ten times, or continuously during the addition time. When the frequency of the addition is increased more and more, the addition will ultimately become continuous. When the frequency of batchwise addition increases, there is a tendency that the total amount of the initiator can be decreased.

It is unnecessary to add the equal amount of the initiator each time. However, if the amounts of aliquots differ too much from one another, the effect of this embodiment is lost. More than two thirds of the total amount of the initiator should not be added in any period equal to one fifth of the addition time of the initiator. Preferably, more than one fifth of the total amount of the initiator should not be added in any period equal to one tenth of the addition time. It is also a preferred embodiment that the total amount of the initiator is divided into ten to twenty equal aliquots which are added at approximately even intervals. In industrial large scale production, continuous addition of the initiator at a constant rate is easier in operations.

In this embodiment, the alkyl group in the starting material, fumaric or maleic dialkyl ester, is preferably an alkyl group having 8 carbon atoms or less, particularly 4 carbon atoms or less. Because the yield was particularly bad in the prior art in the case of a linear alkyl group, the effect of this embodiment is more remarkable in that case.

Any known radical polymerization initiators may be used. The polymerization temperature is preferably 50° to 180° C., particularly 80° to 160° C. It is preferred to add the whole amount of the initiator and then continue reflux and stirring while maintaining the temperature at the aforesaid level. Preferably, it takes 6 to 40 hours, particularly 10 to 30 hours from the start of the addition of the initiator to the termination of the polymerization reaction.

The lubricant according to the invention may be used as a lubricant with a refrigerant in various refrigerating systems in broad fields, such as in air conditioners in buildings or houses, refrigerators, freezers, or car air conditioners.

Further, the lubricant of the invention may be added as an additive to refrigerating machine lubricants based on other substances as a basic oil, such as organic carboxylic esters, polyalkylene glycol, alkyl benzene or mineral oils.

As the refrigerating machine lubricant of the invention comprises the fumaric acid alkyl ester copolymer of the aforesaid specific structure, it is compatible with substitute freon refrigerants such as hydrogen-containing halogenated hydrocarbon, particularly R 134a, in a broad temperature range, and has a high viscosity index. In addition, it is stable thermally and chemically and excellent in lubricity.

The present invention will be further explained with reference to the following Examples, where percentage is based on weight, and viscosity is a kinematic viscosity at a temperature of 100° C.

The yield is a ratio of the weight of the residue remained after removing light-boiling components from a polymerization reaction system by vacuum distillation to the total weight of starting ester monomers.

Compatibility of each lubricant was evaluated as follows:

An oil to be tested and a refrigerant (1,1,1,2-tetrafluoroethane, R 134a) are sampled and mixed in a glass tube so that the volume percent, based on the whole, of the oil is 15% and the total volume is 2 ml. The glass tube is then placed in a thermostatic chamber having a cooling unit and a temperature at which the oil and the refrigerant separate from each other in a low temperature range is determined. Next, another glass tube is filled with the oil to be tested and the refrigerant so that the volume percent, based on the whole, of the oil is 15% and the total volume is 2 ml, which are mixed. The glass tube is then placed in a thermostatic chamber having a heating unit and a temperature at which the oil and the refrigerant separates from each other in a higher temperature range is determined. The units used cannot allow measurement at −45° C. or below or at 80° C. or higher. When such occasion arises, the above temperatures are indicated in Example 12 and after.

EXAMPLE 1

In a 500 ml four-necked flask were charged 305 mmol (52.5 g) of diethyl fumarate obtained by isomerization of diethyl maleate and 400 ml of p-xylene. The flask was provided with a thermometer, a dropping funnel and a condenser, and put in an oil bath. While maintaining the temperature at 135° C. under stirring with a magnetic stirrer and refluxing under a flow of nitrogen, a solution of 35 mmol (5.8 g) of AIBN (2,2-azobisisobutyronitrile) in p-xylene was added dropwise over 11 hours. The heating and refluxing were continued for further 19 hours. The solvent and unreacted reactant were then distilled off under reduced pressure to obtain 49 g of a reaction product with a yield of 94%.

The viscosity and the compatibility of the reaction product were as shown in Table 1 below.

EXAMPLE 2

The same procedure as in Example 1 was repeated with the same apparatus as in Example 1 to obtain a reaction product with the exception that the following conditions were used: 305 mmol of diethyl fumarate; 250 ml of o-xylene; 50 mmol of ABN; reaction temperature of 135° C.; and reaction time of 4 hours. The viscosity and the compatibility of the reaction product were as shown in Table 1 below.

EXAMPLE 3

The same procedure as in Example 1 was repeated with the same apparatus as in Example 1 to obtain a reaction product with the exception that the following conditions were used: 310 mmol of diethyl fumarate; no solvent used; 10 mmol of AIBN; reaction temperature of 80° C.; and reaction time of 8 hours.

The viscosity and the compatibility of the reaction product were as shown in Table 1 below.

EXAMPLE 4

The same procedure as in Example 1 was repeated with the same apparatus as in Example 1 to obtain a reaction product with the exception that the following conditions were used: 310 mmol of diethyl fumarate; no solvent used; 2 mmol of AIBN; reaction temperature of 80° C.; and reaction time of 8 hours.

The viscosity and the compatibility of the reaction product were as shown in Table 1 below.

EXAMPLE 5

The same procedure as in Example 1 was repeated with the same apparatus as in Example 1 to obtain a reaction product with the exception that the following conditions were used: 305 mmol of diethyl fumarate; no solvent used; 35 mmol of AIBN; reaction temperature of 135° C.; and reaction time of 12 hours.

The viscosity and the compatibility of the reaction product were as shown in Table 1 below.

EXAMPLE 6

The same procedure as in Example 1 was repeated with the same apparatus as in Example 1 to obtain a reaction product with the exception that 217 mmol of dibutyl fumarate were used; the reaction temperature was 118° C.; a solution of 27.5 mmol of AIBN in methylisobutyl ketone (MIBK) was added dropwise over 12 hours; and the reaction time was 24 hours.

The viscosity and the compatibility of the reaction product were as shown in Table 1 below.

EXAMPLE 7

An oil mixture consisting of 63% of the reaction product prepared in Example 4 and 37% of an organic carboxylic ester (P-51, Mobile Oil Company) was prepared as a lubricant for a refrigerating machine. The viscosity and the compatibility of the oil mixture were as shown in Table 1 below.

EXAMPLE 8

An oil mixture consisting of 49% of the reaction product prepared in Example 4 and 51% of an esterification product of dipentaerythritol with a $C_6$ acid was prepared as a lubricant for a refrigerating machine. The viscosity and the compatibility of the oil mixture were as shown in Table 1 below.

EXAMPLE 9

An oil mixture consisting of 83% of the reaction product prepared in Example 3 and 17% of an organic carboxylic ester (P-52, Mobile Oil Company) was prepared as a lubricant for a refrigerating machine. The viscosity and the compatibility of the oil mixture were as shown in Table 1 below.

EXAMPLE 10

The lubricant prepared in Example 4 was distilled under reduced pressure to remove lower-polymerization degree components. The remaining solid was mixed with the lubricant prepared in Example 2 in a concentration of the solid of 5% to prepare a lubricant for a refrigerating machine. The viscosity and the compatibility of the oil mixture were as shown in Table 1 below.

EXAMPLE 11

A lubricant for a refrigerating machine was prepared by mixing polymethyl methacrylate having a weight average molecular weight of 12,000 with the lubricant prepared in Example 2 in a concentration of the polymethyl methacrylate of 5%. The viscosity and the compatibility of the oil mixture were as shown in Table 1 below.

COMPARATIVE EXAMPLE 1

Organic carboxylic ester (P-51, Mobile Oil Company) was elvaluated as a lubricant for a refrigerating machine. The viscosity and the compatibility were as shown in Table 1 below.

COMPARATIVE EXAMPLE 2

An esterification product of dipentaerythritol with a $C_6$ acid was evaluate as a lubricant for a refrigerating machine. The viscosity and the compatibility were as shown in Table 1 below.

EXAMPLE 3

Polypropylene glycol dimethyl ether was evaluated as a lubricant for a refrigerating machine. The viscosity and the compatibility were as shown in Table 1 below.

TABLE 1

| | Kinematic Viscosity, cSt | | Viscosity | Compatibility with Refrigerant, °C. | |
|---|---|---|---|---|---|
| | 40° C. | 100° C. | Index | Low Temp. | High Temp. |
| Example 1 | 108 | 7.6 | −48 | −50 | 90 |
| 2 | 296 | 15.8 | 17.3 | −50 | 90 |
| 3 | 489 | 49.0 | 162 | −50 | 90 |
| 4 | 1650 | 175. | 230 | −50 | 90 |
| 5 | 6715 | 99.7 | 41.8 | −50 | 90 |
| 6 | 383 | 31. | 113 | −50 | 90 |
| 7 | 230 | 30.8 | 175 | −50 | 90 |
| 8 | 250 | 33. | 177 | −50 | 90 |
| 9 | 250 | 30. | 159 | −50 | 90 |
| 10 | 475 | 23.8 | 52.9 | −50 | 90 |
| 11 | 706 | 30. | 52.7 | −50 | 80 |
| Comp. Ex. 1 | 24 | 5 | 133 | −30 | 90 |
| 2 | 110 | 11 | 81 | −40 | 38 |
| 3 | 135 | 19 | 160 | −50 | 38 |

As seen from the above Table, the lubricant for a refrigerating machine according to the invention is highly compatible with a hydrogen-containing refrigerant, stable thermally and chemically, and excellent in lubricity.

Particularly Preferred Embodiment

EXAMPLE 12

In a 200 ml one-necked flask were charged 294 mmol (67.2 g, 67.8 ml) of di-n-butyl fumarate and 196 mmol (33.8 g, 32.2 ml) of diethyl fumarate in a molar ratio of 6:4. A condenser was attached on the flask, which was then put in an oil bath. While maintaining the temperature at 60° C. under stirring with a magnetic stirrer, 20 mmol (3.8 g) of 2,2'-azobisisobutyronitrile (AIBN) and 30 ml of tetrahydrofuran were added. The stirring and heating were continued at this temperature for 72 hours. Light-boiling components were then distilled off under reduced pressure to obtain 91.6 g of a polymerized product. The yield was 91%.

The kinematic viscosity and the viscosity index of the polymerized product obtained were determined. The compatibility was also tested. The results are as shown in Table 2.

EXAMPLE 13

Polymerization reaction was carried out as in Example 12 with the exception that the amounts of di-n-butyl fumarate and diethyl fumarate were 402 mmol (91.8 g, 92.7 ml) and 45 mmol (7.7 g, 7.3 ml) respectively (molar ratio of 9:1). A polymerization product was obtained in an amount of 89.6 g. The yield was 90%.

The kinematic viscosity and the viscosity index of the polymerization product obtained were determined as in Example 12. The compatibility was also tested. The results are as shown in Table 2.

EXAMPLE 15

Polymerization reaction was carried out as in Example 12 with the exception that 190 mmol (64.7 g, 68.8 ml) of di-2-ethylhexyl fumarate and 190 mmol (32.8 g, 31.2 ml) of diethyl fumarate were used in place of di-n-butyl fumarate and diethyl fumarate. A polymerization product was obtained in an amount of 95.6 g. The yield was 98%.

The kinematic viscosity and the viscosity index of the polymerization product obtained were determined as in Example 12. The compatibility was also tested. The results are as shown in Table 2.

EXAMPLE 16

The polymerization product prepared in Example 13 was mixed with polypropylene glycol dimethyl ether having a kinematic viscosity at 100° C. of 19 cSt in a weight ratio of 80:20 to obtain a lubricant.

The kinematic viscosity and the viscosity index of the lubricant obtained were determined as in Example 12. The compatibility was also tested. The results are as shown in Table 2.

EXAMPLE 17

The polymerization product prepared in Example 13 was mixed with an esterification product of dipentaerythritol with hexanoic acid having a kinematic viscosity at 100° C. of 11 cSt in a weight ratio of 80:20 to obtain a lubricant.

The kinematic viscosity and the viscosity lubricant obtained were determined as in Example 12. The compatibility was also tested. The results are as shown in Table 2.

COMPARATIVE EXAMPLE 4

In a 200 ml one-necked flask were charged 620 mmol (105 g, 100 ml) of diethyl fumarate. A condenser was attached on the flask, which was then—put in an oil bath. While maintaining the temperature at 80° C., under stirring with a magnetic stirrer, there were added 70 mmol (11.5 g) of 2,2'-azobisisobutyronitrile (AIBN) and 100 ml of methyl ethyl ketone. The stirring and heating were continued at this temperature for 24 hours. Light-boiling components were then distilled off under reduced pressure to obtain 97.8 g of a polymerization product. The yield was 93%.

The kinematic viscosity and the viscosity index of the polymerization product obtained were determined as in Example 12. The compatibility was also tested. The results are as shown in Table 2.

COMPARATIVE EXAMPLE 5

In a 200 ml one-necked flask were charged 434 mmol (99 g, 100 ml) of di-n-butyl fumarate. A condenser was attached on the flask, which was then put in an oil bath. While maintaining the temperature at 90° C. under stirring with a magnetic stirrer, there were added 61 mmol (10.0 g) of 2,2'-azobisisobutyronitrile (AIBN) and 80 ml of methyl isobutyl ketone. The stirring and heating were continued at this temperature for 24 hours. Light-boiling components were then distilled off under reduced pressure to obtain 84.9 g of a polymerization product. The yield was 86%.

The kinematic viscosity and the viscosity index of the polymerization product obtained were determined as in Example 12. The compatibility was also tested. The results are as shown in Table 2.

COMPARATIVE EXAMPLE 6

In a 200 ml one-necked flask were charged 610 mmol (105 g, 100 ml) of diethyl-fumarate. A condenser was attached on the flask, which was then put in an oil bath. While maintaining the temperature at 155° C. under stirring with a magnetic stirrer, there were added 70 mmol (11.5 g) of 2,2'-azobisisobutyronitrile (AIBN) and 100 ml of o-xylene. The stirring and heating were continued at this temperature for 24 hours. Light-boiling components were then distilled off under reduced pressure to obtain 104.8 g of a polymerization product. The yield was 100%.

The kinematic viscosity and the viscosity index of the polymerization product obtained were determined as in Example 12. The compatibility was also tested. The results are as shown in Table 2.

COMPARATIVE EXAMPLE 7

In a 200 ml one-necked flask were charged 434 mmol (99 g, 100 ml) of di-n-butyl fumarate. A condenser was attached on the flask, which was then put in an oil bath. While maintaining the temperature at 80° C. under stirring with a magnetic-stirrer, there were added 80 mmol (13.1 g) of 2,2'-azobisisobutyronitrile (AIBN) and 10 ml of tetrahydrofuran. The stirring and heating were continued at this temperature for 72 hours. Light-boiling components were then distilled off under reduced pressure to obtain 94.1 g of a polymerization product. The yield was 95%.

The kinematic viscosity and the viscosity index of the polymerization product obtained were determined as in Example 12. The compatibility was also tested. The results are as shown in Table 2.

COMPARATIVE EXAMPLE 8

In a 200 ml one-necked flask were charged 499 mmol (100 g, 100 ml) of di-n-propyl fumarate. A condenser was attached on the flask, which was then put in an oil bath. While maintaining the temperature at 135° C. under stirring with a magnetic stirrer, there were added 70 mmol (11.5 g) of 2,2'-azobisisobutyronitrile (AIBN) and 100 ml of p-xylene. The stirring and heating were continued at this temperature for 24 hours. Light-boiling components were then distilled off under reduced pressure to obtain 24.8 g of a polymerization product. The yield was 25%.

The kinematic viscosity and the viscosity index of the polymerization product obtained were determined as in Example 12. The compatibility was also tested. The results are as shown in Table 2.

COMPARATIVE EXAMPLE 9

In a 200 ml one-necked flask were charged 276 mmol (94 g, 100 ml) of di-2-ethylhexyl fumarate. A condenser was attached on the flask, which was then put in an oil bath. While maintaining the temperature at 135° C. under stirring with a magnetic stirrer, there were added 46 mmol (7.6 g) of 2,2'-azobisisobutyronitrile (AIBN) and 250 ml of p-xylene. The stirring and heating were continued at this temperature for 8 hours. Light-boiling components were then distilled off under reduced pressure to obtain 54.8 g of a polymerization product. The yield was 58%.

The kinematic viscosity and the viscosity index of the polymerization product obtained were determined as in Example 12. The compatibility was also tested. The results are as shown in Table 2.

TABLE 2

|  | Kinematic Viscosity, cSt | | Viscosity | Temperature Range for Compatibility with |
|---|---|---|---|---|
|  | 40° C. | 100° C. | Index | Refrigerant, °C. |
| Example 12 | 1055 | 51.0 | 94 | −45–80 |
| 13 | 455 | 33.7 | 110 | −34–80 |
| 15 | 434 | 23.0 | 57 | −45–80 |
| 16 | 211 | 22.2 | 128 | −45–80 |
| 17 | 263 | 23.8 | 113 | −45–80 |
| Comp. Ex. 4 | 3090 | 54.0 | −2 | −45–80 |
| 5 | 728 | 50.8 | 123 | not compatible at room temp. |
| 6 | 1321 | 31.0 | −32 | −45–80 |
| 7 | 460 | 33.5 | 108 | −28–80 |
| 8 | 296 | 16.0 | 17 | −37–80 |
| 9 | 119 | 12.0 | 84 | not compatible at room temp. |

Particularly Preferred Embodiment (B)

EXAMPLE 18

In a 200 ml one-necked flask were charged 294 mmol (67.1 g, 67.a ml) of di-n-butyl fumarate and 196 mmol (33.8 g, 32.2 ml) of diethyl fumarate in a molar ratio of 6:4. A condenser was attached on the flask, which was then put in an oil bath. While maintaining the temperature at 60° C. under stirring with a magnetic stirrer, there were—added 20 mmol (3.8 g) of 2,2'-azobisisobutyronitrile (AIBN) and 30 ml of tetrahydrofuran. The stirring and heating were continued at this temperature for 72 hours. Light-boiling components were then distilled off under reduced pressure to obtain 91.6 g of a polymerization product. The yield was 91%.

Here, the yield is a ratio of the weight of the residue remained after removing light-boiling components from the polymerization reaction system by vacuum distillation to the total weight of the starting ester monomers.

Figure 2:
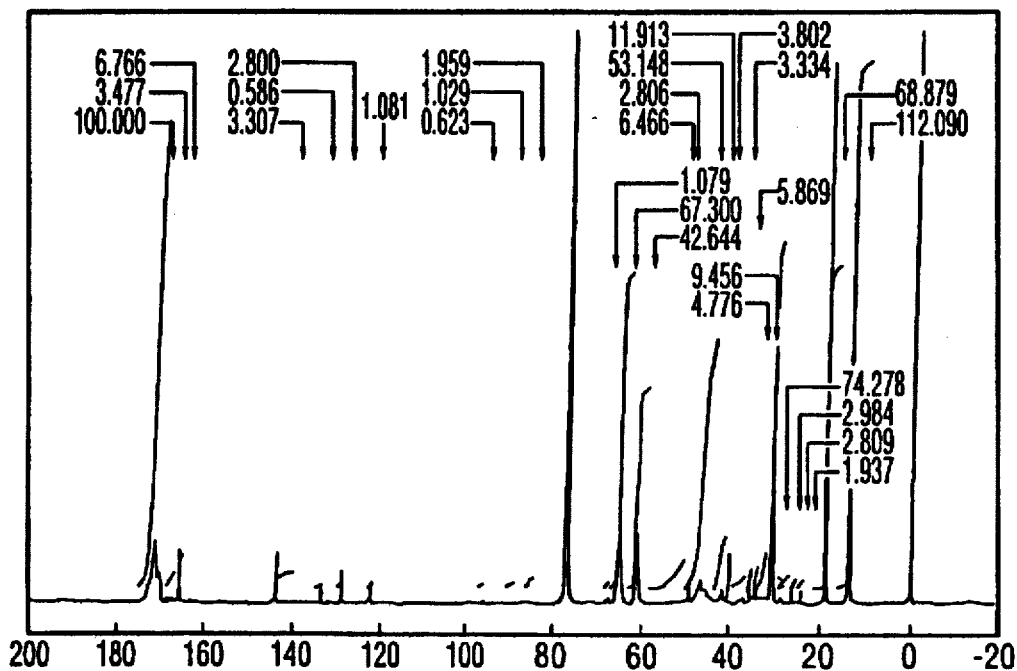
FIG. 2 is a chart showing the results of analysis by $^{13}C$—NMR on the fumaric ester copolymer of the invention produced in Example 18.

The polymerization product obtained was analyzed by $^1$H—NMR and $^{13}$C—NMR. The results are as shown in FIGS. 1 and 2.

$^1$H—NMR and $^{13}$C—NMR analyses were conducted under the following conditions:

$^1$H—NMR

Apparatus; JEOL EX-400 100 MHz, Nihon Denshi Company.

Solvent: $CDCl_3$/TMS 30° C.

$^{13}$C—NMR

Apparatus: JEOL EX-400 100 MHz, Nihon Denshi Company.

Solvent: $CDCl_3$/TMS 30° C.

As seen from the results of $^{13}$C—NMR in FIG. 2, the area ratio of the peak corresponding to —O—$CH_2$ in dibutyl fumarate (64 ppm) is 67.300 and the area ratio of the peak corresponding to —O—$CH_2$— in diethyl fumarate (61 ppm) is 42.644, and further the number average molecular weight (Mn) measured by a vapor pressure osmometry method was 930, wherefrom it is seen that the above polymerization product was a random copolymer of diethyl fumarate and di-n-butyl fumarate, composed of 39 mole % of the recurring unit represented by the aforesaid formula (V) and 61 mole % of the recurring unit represented by the aforesaid formula (VI), with a polymerization degree of 7.86.

The kinematic viscosity and the viscosity index of the above polymerization product were then determined. The compatibility was also tested. The results are as shown in Table 3.

EXAMPLE 19

Polymerization reaction was conducted as in Example 18 with the exception that the amounts of di-n-butyl fumarate and diethyl fumarate were 402 mmol (91.8 g, 92.7 ml) and 45 mmol (7.7 g, 7.3 ml) respectively (molar ratio of 9:1). A polymerization product of 89.6 g was obtained. The yield was 90%.

Figure 3:
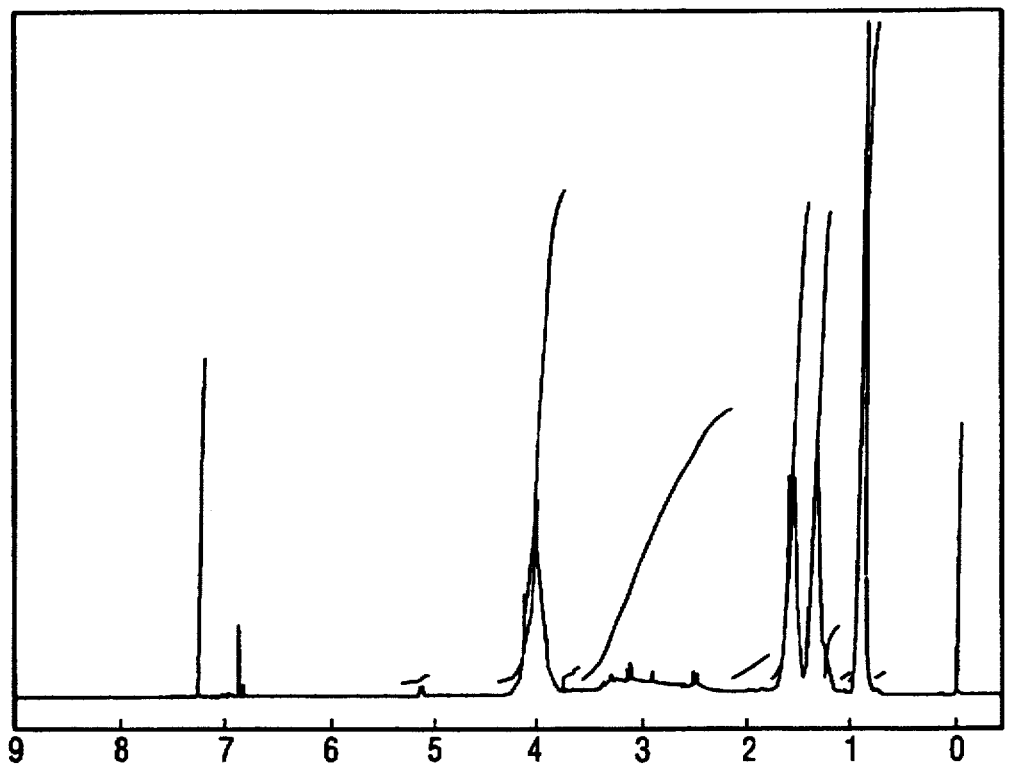
FIG. 3 is a chart showing the results of analysis by $^1H$—NMR on the fumaric ester copolymer of the invention produced in Example 19.

$^1$H—NMR and $^{13}$C—NMR analyses of the polymerization product obtained were conducted under the same conditions as in Example 18. The results are as shown in FIGS. 3 and 4.

Figure 4:
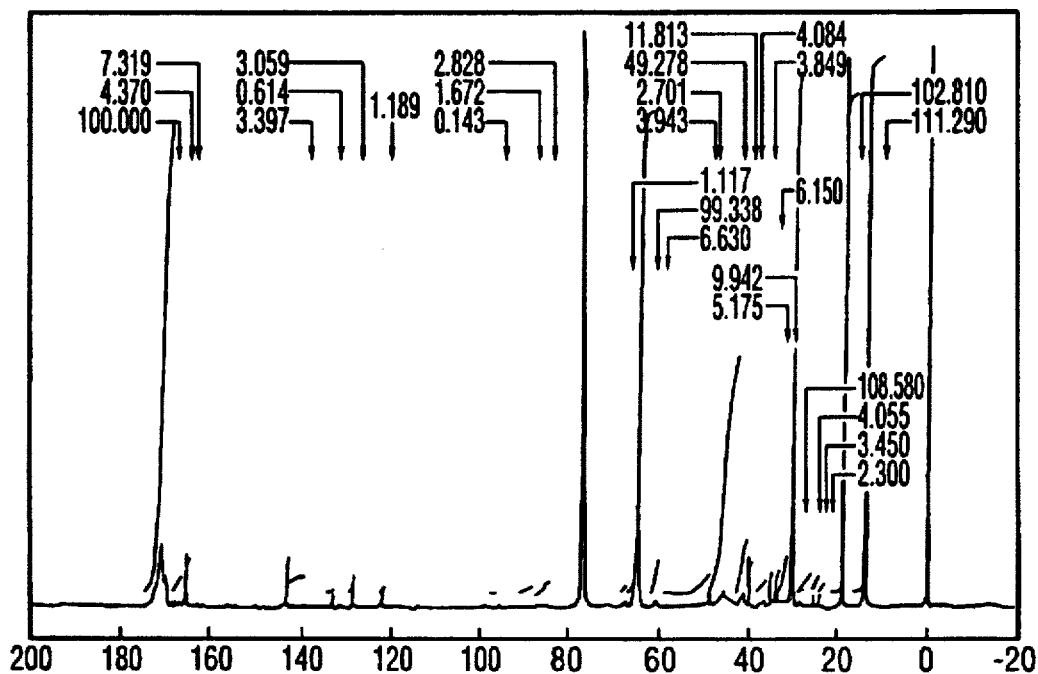
FIG. 4 is a chart showing the results of analysis by $^{13}C$—NMR on the fumaric ester copolymer of the invention produced in Example 19.

As seen from the results of $^{13}$C—NMR in FIG. 4, the area ratio of the peak corresponding to —O—$CH_2$— in dibutyl fumarate (64 ppm) is 99.338 and the area ratio of the peak corresponding to —O—$CH_2$— in diethyl fumarate (61 ppm) is 6.630, and further the number average molecular weight (Mn) measured by a vapor pressure osmometry method was 1000, wherefrom it is seen that the above polymerization product was a random copolymer of diethyl fumarate and di-n-butyl fumarate, composed of 6 mole % of the recurring unit represented by the aforesaid formula (V) and 94 mole % of the recurring unit represented by the aforesaid formula (VI), with a polymerization degree of 6.79.

The kinematic viscosity and the viscosity index of the above polymerization product were then determined. The compatibility was also tested. The results are shown in Table 3.

COMPARATIVE EXAMPLE 10

In a 200 ml one-necked flask were charged 610 mmol (105 g, 100 ml) of diethyl fumarate. A condenser was attached on the flask, which was then put in an oil bath. While maintaining the temperature at 80° C. under stirring with a magnetic stirrer, there were added 70 mmol (11.5 g) of 2,2'-azobisisobutyronitrile (AIBN) and 100 ml of methyl ethyl ketone. The stirring and heating were continued a this temperature for 24 hours. Light-boiling components were then distilled off under reduced pressure to obtain 97.8 g of a polymerization product. The yield was 93%.

Figure 5:
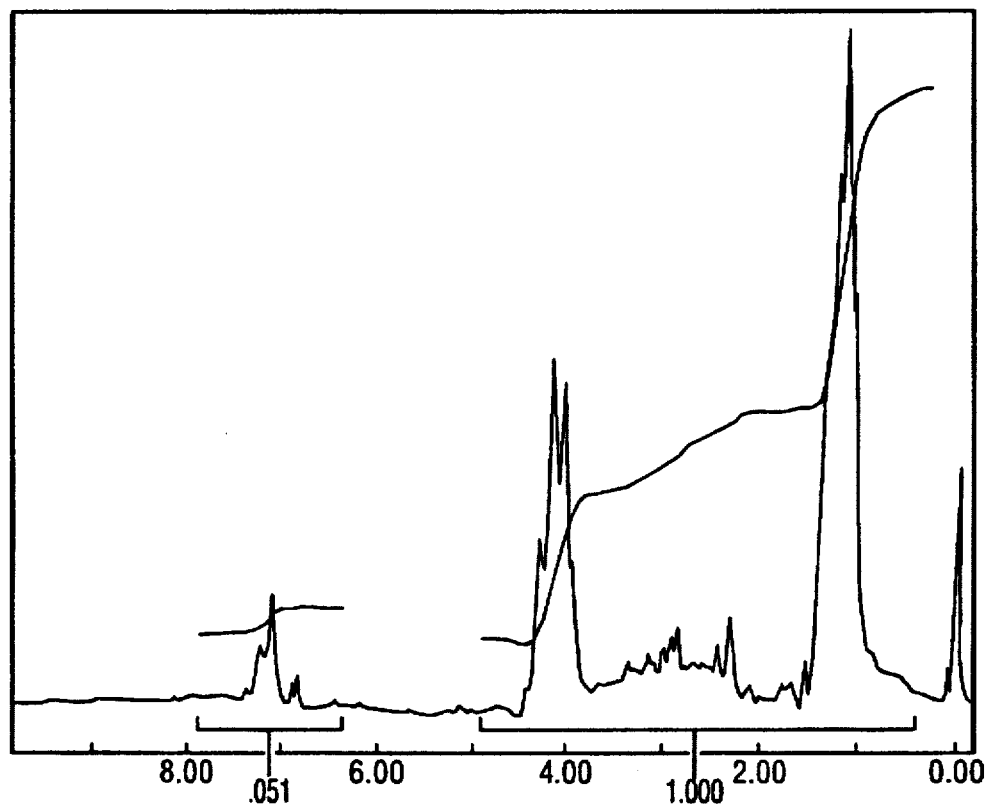
FIG. 5 is a chart showing the results of analysis by $^1H$—NMR on the diethyl fumarate polymer produced in Comparative Example 10.
Figure 6:
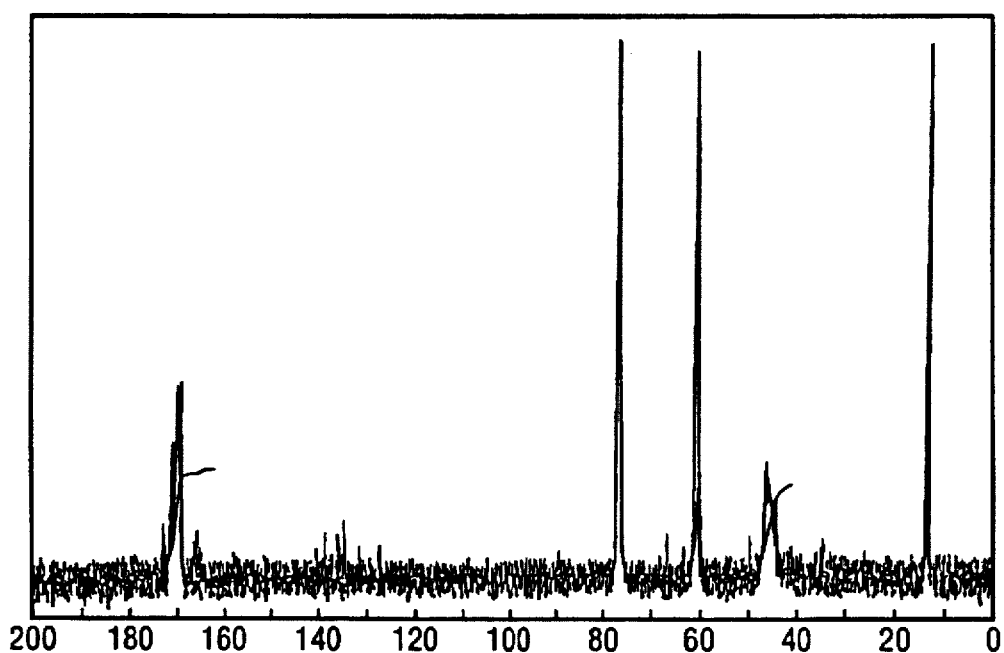
FIG. 6 is a chart showing the results of analysis by $^{13}C$—NMR on the diethyl fumarate polymer produced in Comparative Example 10.

The polymerization product obtained was analyzed by $^1$H—NMR and $^{13}$C—NMR under the same conditions as in Example 18. The results are as shown in FIGS. 5 and 6. From these results it was confirmed that this polymerization product was a homopolymer of diethyl fumarate.

The kinematic viscosity and the viscosity index were then determined as in Example 18. The compatibility was also tested. The results are as shown in Table 3.

COMPARATIVE EXAMPLE 11

In a 200 ml one-necked flask were charged 434 mmol (99 g, 100 ml) of di-n-butyl fumarate. A condenser was attached on the flask, which was then put in an oil bath. While maintaining the temperature at 60° C. under stirring with a magnetic stirrer, there were added 40 mmol (6.57 g) of 2,2'-azobisisobutyronitrile (AIBN) and 40 ml of tetrahydrofuran. The stirring and heating were continued at this temperature for 72 hours. Light-boiling components were then distilled off under reduced pressure to obtain 99.9 g of a polymerization product. The yield was 100%.

Figure 7:
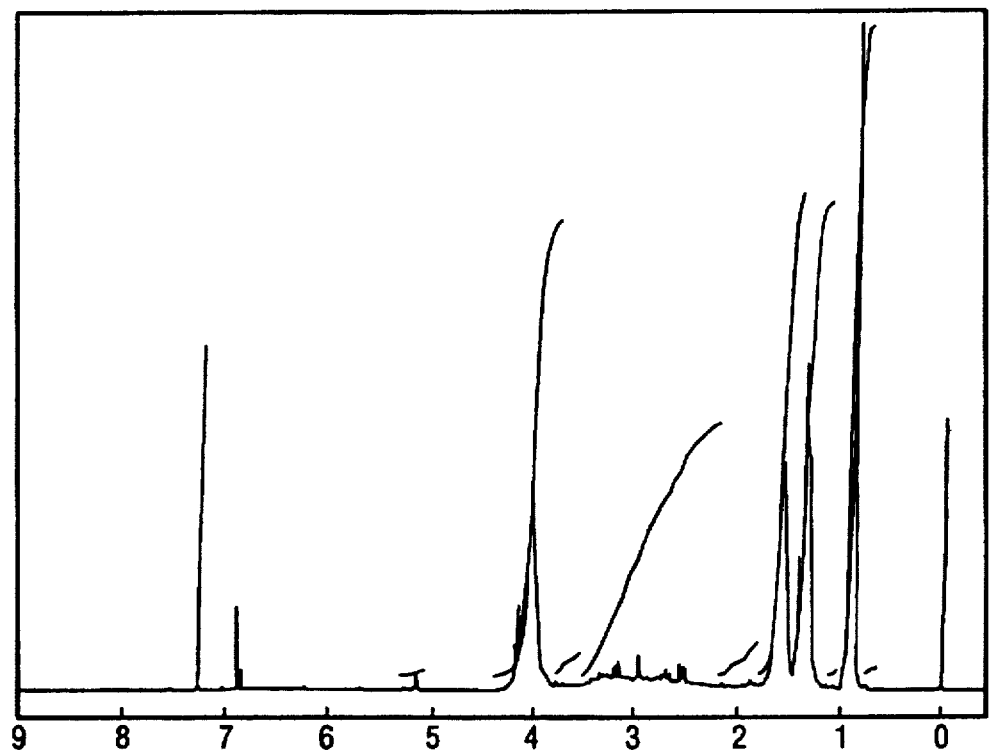
FIG. 7 is a chart showing the results of analysis by $^1H$—NMR on the diethyl fumarate polymer produced in Comparative Example 11.
Figure 8:
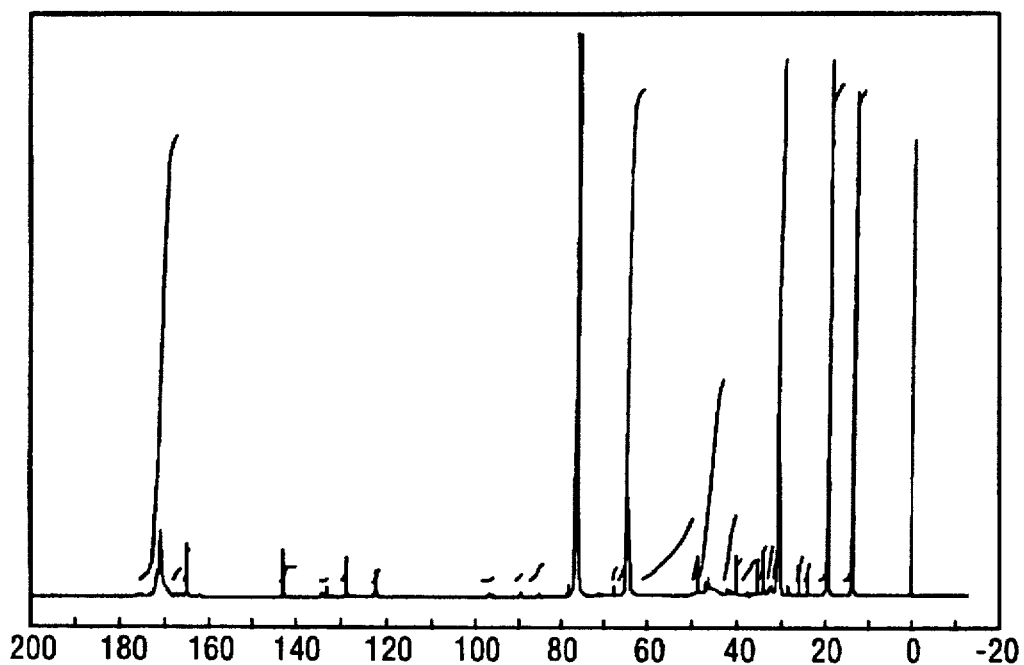
FIG. 8 is a chart showing the results of analysis by $^{13}C$—NMR on the diethyl fumarate polymer produced in Comparative Example 11.

The polymerization product obtained was analyzed by $^1$H—NMR and $^{13}$C—NMR under the same conditions as in Example 18. The results are as shown in FIGS. 7 and 8. From these results it was confirmed that this polymerization product was a homopolymer of di-n-butyl fumarate.

The number average molecular weight (Mn) which was determined in the same manner as in Example 18 was 840. The kinematic viscosity and the viscosity index were also determined. The compatibility was also tested. The results are as shown in Table 3.

TABLE 3

| | Number Average Molecular weight, Mn | Kinematic Viscosity, cSt | | Viscosity Index | Temperature Range for Compatibility with Refrigerant, °C. |
|---|---|---|---|---|---|
| | | 40° C. | 100° C. | | |
| Example 18 | 930 | 1055 | 51.0 | 94 | −45–80 |
| 19 | 1000 | 455 | 33.7 | 110 | −34–80 |
| Comp. Ex. 10 | — | 3090 | 54.0 | −2 | −45–80 |
| 11 | 840 | 255 | 22.0 | 104 | −44–80 |

Preferred Polymerization Initiator

EXAMPLE 20

In a 100 ml one-necked flask were charged 217 mmol (49.5 g, 50 ml) of di-n-butyl fumarate. A condenser was attached on the flask, which was then put in an oil bath. While maintaining the temperature at 145° C. under stirring with a magnetic stirrer, there was added 1 mmol (0.2 ml) of t-butyl peroxide (TBPO). The stirring and heating were continued at this temperature for 24 hours. Light-boiling components were then distilled off under reduced pressure to obtain 46.7 g of a polymerization product which was colorless. The yield was 94%.

The kinematic viscosity and the viscosity index of the polymerization product obtained were determined. The compatibility was also tested. The results are as shown in Table 4.

EXAMPLE 21

In a 200 ml one-necked flask were charged 402 mmol (91.8 g, 92.7 ml) of di-n-butyl fumarate and 45 mmol (7.7 g, 7.3 ml) of diethyl fumarate in a solar ratio of 9:1. A condenser was attached on the flask, which was then put in an oil bath. While maintaining the temperature at 150° C. under stirring with a magnetic stirrer, there were added 2 mmol (0.4 ml) of t-butyl peroxide (TBPO). The stirring and heating were continued at this temperature for 72 hours. Light-boiling components were then distilled off under reduced pressure to obtain 93.3 g of a polymerization product which was colorless. The yield was 94%.

The kinematic viscosity and the viscosity index of the polymerization product obtained were determined in the same manner as in Example 20. The compatibility was also tested. The results are as shown in Table 4.

EXAMPLE 22

Polymerization reaction was carried out as in Example 20 with the exception that 219 mmol (50 g, 50 ml) of di-n-butyl maleate were used in place of di-n-butyl fumarate and 1.14 mmol (0.1 ml) of morpholine were further added to the reaction system initially. A polymerization product of 46.2 g was obtained. The product was colorless. The yield was 92%.

The kinematic viscosity and the viscosity index of the polymerization product obtained were determined as in Example 20. The compatibility was also tested. The results are as shown in Table 4.

COMPARATIVE EXAMPLE 12

In a 100 ml one-necked flask were charged 217 mmol (49.5 g, 50 ml) of di-n-butyl fumarate. A condenser was attached on the flask, which was then put in an oil bath. While maintaining the temperature at 90° C. under stirring with a magnetic stirrer, there were added 27.5 mmol (4.5 g) of 2,2'-azobisisobutyronitrile (AIBN) and 20 ml of tetrahydrofuran. The stirring and heating were continued at this temperature for 24 hours. Light-boiling components were then distilled off under reduced pressure to obtain 49.9 g of a polymerization product. The yield was 100%. The product was colored.

COMPARATIVE EXAMPLE 13

In a 200 ml one-necked flask were charged 402 mmol (91.8 g, 92.7 ml) of di-n-butyl fumarate and 45 mmol (7.7 g, 7.3 ml) of diethyl fumarate in a molar ratio of 9:1. A condenser was attached on the flask, which was then put in an oil bath. While maintaining the temperature at 60° C. under stirring with a magnetic stirrer, there were added 20 mmol (3.8 g) of 2,2'-azobisisobutyronitrile (AIBN) and 30 ml of tetrahydrofuran. The stirring and heating were continued at this temperature for 72 hours. Light-boiling components were then distilled off under reduced pressure to obtain 89.6 g of a polymerization product. The yield was 90%. The product was colored.

The kinematic viscosity and the viscosity index of the polymerization product obtained were determined as in Example 20. The compatibility was also tested. The results are as shown in Table 4.

TABLE 4

| | Kinematic Viscosity, cSt | | Viscosity Index | Temperature Range for Compatibility with Refrigerant, °C. |
|---|---|---|---|---|
| | 40° C. | 100° C. | | |
| Example 20 | 388 | 34.8 | 131 | −12–80 |
| 21 | 420 | 34.8 | 122 | −36–80 |
| 22 | 256 | 25.7 | 129 | −17–80 |
| Comp. Ex. 12 | 405 | 33.0 | 118 | 8–80 |
| 13 | 405 | 33.7 | 110 | −34–80 |

Preferred Polymerization Solvent

EXAMPLE 23

In a 200 ml one-necked flask were charged 217 mmol (49.5 g, 50 ml) of di-n-butyl fumarate. A condenser was attached on the flask, which was then put in an oil bath. While maintaining the temperature at 60° C. under stirring with a magnetic stirrer, there were added 10 mmol (1.6 g) of 2,2'-azobisisobutyronitrile (AIBN) and 100 ml of tetrahydrofuran. The stirring and heating were continued at this temperature for 72 hours. Light-boiling components were then distilled off under reduced pressure to obtain 49.6 g of a polymerization product. The yield was 100%.

The kinematic viscosity and the viscosity index of the polymerization product obtained were determined. The compatibility was also tested. The results are as shown in Table 5.

EXAMPLE 24

Polymerization reaction was conducted as in Example 23 with the exception that a 100 ml one-necked flask was used and the amount of tetrahydrofuran was 10 ml. A polymerization product of 45.1 g was thus obtained. The yield was 91%.

The kinematic viscosity and the viscosity index of the polymerization product obtained were determined as in Example 23. The compatibility was also tested. The results are as shown in Table 5.

EXAMPLE 25

Polymerization reaction was carried out as in Example 23 with the exception that 219 mmol (50 g, 50 ml) of di-n-butyl maleate were used in place of di-n-butyl fumarate and 1.14 mmol (0.1 ml) of morpholine were further added to the reaction system initially. A polymerization product of 49.2 g was obtained. The yield was 98%.

The kinematic viscosity and the viscosity index of the polymerization product obtained were determined as in Example 23. The compatibility was also tested. The results are as shown in Table 5.

COMPARATIVE EXAMPLE 14

Polymerization reaction was carried out as in Example 24 with the exception that 10 ml of tetrahydrofuran were not added. A polymerization product of 10.9 g was obtained. The yield was 22%.

The kinematic viscosity and the viscosity index of the polymerization product obtained were determined as in Example 23. The compatibility was also tested. The results are as shown in Table 5.

COMPARATIVE EXAMPLE 15

Polymerization reaction was carried out as in Example 23 with the exception that 100 ml of isopropyl alcohol were used in place of tetrahydrofuran as a solvent. A polymerization product of 33.2 g was obtained. The yield was 67%.

The kinematic viscosity and the viscosity index of the polymerization product obtained were determined as in Example 23. The compatibility was also tested. The results are as shown in Table 5.

COMPARATIVE EXAMPLE 16

Polymerization reaction was carried out as in Example 23 with the exception that 100 ml of heptane were used in place of tetrahydrofuran as a solvent. A polymerization product of 33.2 g was obtained. The yield was 67%.

The kinematic viscosity and the viscosity index of the polymerization product obtained were determined as in Example 23. The compatibility was also tested. The results are as shown in Table 5.

COMPARATIVE EXAMPLE 18

Polymerization reaction was carried out as an Example 23 with the exception that 100 ml of γ-butyrolactone were used in place of tetrahydrofuran as a solvent. A polymerization product of 28.7 g was obtained. The yield was 57%.

The kinematic viscosity and the viscosity index of the polymerization product obtained were determined as in Example 23. The compatibility was also tested. The results are as shown in Table 5.

COMPARATIVE EXAMPLE 19

Polymerization reaction was carried out as in Example 23 with the exception that 100 ml of toluene were used in place of tetrahydrofuran as a solvent. A polymerization product of 26.7 g was obtained. The yield was 54%.

The kinematic viscosity and the viscosity index of the polymerization product obtained were determined as in Example 23. The compatibility was also tested. The results are as shown in Table 5.

COMPARATIVE EXAMPLE 20

Polymerization reaction was carried out as in Example 23 with the exception that—100 ml of o-xylene were used in place of tetrahydrofuran as a solvent. A polymerization product of 26.2 g was obtained. The yield was 53%.

The kinematic viscosity and the viscosity index of the polymerization product obtained were determined as in Example 23. The compatibility was also tested. The results are as shown in Table 5.

COMPARATIVE EXAMPLE 21

Polymerization reaction was carried out as in Example 23 with the exception that 100 ml of methyl ethyl ketone were used in place of tetrahydrofuran as a solvent. A polymerization product of 31.2 g was obtained. The yield was 63%.

The kinematic viscosity and the viscosity index of the polymerization product obtained were determined as in Example 23. The compatibility was also tested. The results are as shown in Table 5.

COMPARATIVE EXAMPLE 22

Polymerization reaction was carried out as in Example 23 with the exception that 100 ml of ethanol were used in place of tetrahydrofuran as a solvent. A polymerization product of 34.2 g was obtained. The yield was 69%.

The kinematic viscosity and the viscosity index of the polymerization product obtained were determined as in Example 23. The compatibility was also tested. The results are as shown in Table 5.

COMPARATIVE EXAMPLE 23

Polymerization reaction was carried out as in Example 23 with the exception that 100 ml of n-butanol were used in place of tetrahydrofuran as a solvent. A polymerization product of 23.8 g was obtained. The yield was 48%.

The kinematic viscosity and the viscosity index of the polymerization product obtained were determined as in Example 23. The compatibility was also tested. The results are as shown it Table 5.

COMPARATIVE EXAMPLE 24

Polymerization reaction was carried out as in Example 23 with the exception that 100 ml of benzene were used in place of tetrahydrofuran as a solvent. A polymerization product of 31.7 g was obtained. The yield was 64%.

The kinematic viscosity and the viscosity index of the polymerization product obtained were determined as in Example 23. The compatibility was also tested. The results are as shown in Table 5.

As seen in Table 5, high yield is attained by the use of tetrahydrofuran.

used in place of p-xylene as a solvent. A polymerization product of 33.2 g was obtained. The yield was 67%.

The kinematic viscosity and the viscosity index of the polymerization product obtained were determined as in

TABLE 5

|  | Solvent Used | Yield, % | Kinematic Viscosity, cSt | | Viscosity Index | Temperature Range for Compatibility with Refrigerant, °C. |
| --- | --- | --- | --- | --- | --- | --- |
|  |  |  | 40° C. | 100° C. |  |  |
| Example 23 | THF | 100 | 78.4 | 9.3 | 93 | −45–80 |
| 24 | THF | 91 | 522 | 42.5 | 130 | 20–60 |
| 25 | THF | 98 | 105 | 11.2 | 91 | −45–80 |
| Comp. Ex. 14 | none | 22 | 4370 | 213 | 160 | Sepatated at r.t. |
| 15 | i-PA | 67 | 159 | 13.3 | 72 | −45–80 |
| 16 | heptane | 67 | 633 | 46.4 | 123 | White turbidity at r.t. |
| 18 | GBL | 57 | 268 | 22.9 | 105 | −11–80 |
| 19 | toluene | 54 | 166 | 18.1 | 121 | −20–80 |
| 20 | o-XY | 53 | 158 | 14.5 | 88 | −45–80 |
| 21 | MEK | 63 | 242 | 21.4 | 105 | −45–80 |
| 22 | EtOH | 69 | 160 | 15.1 | 94 | −45–80 |
| 23 | BuOH | 48 | 180 | 16.6 | 97 | −45–80 |
| 24 | benzene | 64 | 531 | 42.0 | 127 | White turbidity at r.t. |

THF = tetrahydrofuran, i-PA = isopropyl alcohol, p-XY = p-xylene, GBL = γ-butyrolactone, o-XY = o-xylene, MEK = methyl ethyl ketone, Et-OH=ethanol, BuOH = n-butanol

EXAMPLE 26

In a 200 ml one-necked flask were charged 227 mmol (49.5 g, 50 ml) of di-n-butyl fumarate. A condenser was attached on the flask, which was then put in an oil bath. While maintaining the temperature at 60° C. under stirring with a magnetic stirrer, there were added 10 mmol (1.6 g) of 2,2'-azobisIsobutyronitrile (AIBN) and 100 ml of p-xylene. The stirring and heating were continued at this temperature for 72 hours. Light-boiling components were then distilled off under reduced pressure to obtain 33.7 g of a polymerization product. The yield was 68%.

The kinematic viscosity and the viscosity index of the polymerization product obtained were determined. The compatibility was also tested. The results are as shown in Table 6.

EXAMPLE 27

Polymerization reaction was conducted as in Example 26 with the exception that a 100 ml one-necked flask was used and the amount of p-xylene was 10 ml. A polymerization product of 35.1 g was obtained. The yield was 71%.

The kinematic viscosity and the viscosity index of the polymerization product obtained were determined as in Example 26. The compatibility was also tested. The results are as shown in Table 6.

EXAMPLE 28

Polymerization reaction was carried out as in Example 26 with the exception that 219 mmol (50 g, 56 ml) of di-n-butyl maleate were used in place of di-n-butyl fumarate and 1.14 mmol (0.1 ml) of morpholine were further added to the reaction system initially. A polymerization product of 32.5 g was obtained. The yield was 65%.

The kinematic viscosity and the viscosity index of the polymerization product obtained were determined as in Example 26. The compatibility was also tested. The results are as shown in Table 6.

COMPARATIVE EXAMPLE 26

Polymerization reaction was carried out as in Example 26 with the exception that 100 ml of isopropyl alcohol were Example 26. The compatibility was also tested. The results are as shown in Table 6.

COMPARATIVE EXAMPLE 27

Polymerization reaction was carried out as in Example 26 with the exception that 100 ml of o-xylene were used in place of p-xylene as a solvent. A polymerization product of 26.2 g was obtained. The yield was 53%.

The kinematic viscosity and the viscosity index of the, polymerization product obtained were determined as in Example 26. The compatibility was also tested. The results are as shown in Table 6.

COMPARATIVE EXAMPLE 28

Polymerization reaction was carried out as in Example 26 with the exception that 100 ml of ethanol were used in place of p-xylene as a solvent. A polymerization product of 34.2 g was obtained. The yield was 69%.

The kinematic viscosity and the viscosity index of the polymerization product obtained were determined as in Example 26. The compatibility was also tested. The results are as shown in Table 6.

COMPARATIVE EXAMPLE 29

Polymerization reaction was carried out as in Example 26 with the exception that 100 ml of n-butanol were used in place of p-xylene as a solvent. A polymerization product of 23.8 g was obtained. The yield was 48%.

The kinematic viscosity and the viscosity index of the polymerization product obtained were determined as in Example 26. The compatibility was also tested. The results are as shown in Table 6.

As seen in Table 6, a high viscosity index is attained by the use of p-xylene.

TABLE 6

|  | Solvent Used | Kinematic Viscosity, cSt | | Viscosity Index | Temperature Range for Capatibility with Refrigerant, °C. |
| --- | --- | --- | --- | --- | --- |
|  |  | 40° C. | 100° C. |  |  |
| Example 26 | p-XY | 62.3 | 8.4 | 104 | −45−80 |
| 27 | p-XY | 562 | 47.6 | 139 | 20−80 |
| 28 | p-XY | 147 | 15.3 | 106 | −45−80 |
| Comp. Example 26 | I-PA | 159 | 13.3 | 72 | −45−80 |
| 27 | o-XY | 158 | 14.5 | 88 | −45−80 |
| 28 | EtOH | 160 | 15.1 | 94 | −45−80 |
| 29 | BuOH | 180 | 16.6 | 97 | −45−80 | p-XY = p-xylene, THF = tetrahydrofuran, I-PA = isopropyl alcohol, o-XY = o-xylene, EtOH = ethanol, BuOH = n-butanol

Manner of the Addition of a Radical Polymerization Initiator

EXAMPLE 29

In a 100 ml one-necked flask were charged 305 mmol (52.5 g, 50 ml) of diethyl fumarate. The flask was provided with a dropping funnel and a condenser and then put in oil bath. While maintaining the temperature at 135° C. under stirring with a magnetic stirrer, a solution of 10 mmol (1.6 g) of 2,2'-azobisisobutyronitrile in 20 ml of tetrahydrofuran was added dropwise over 4 hours. The heating was continued for further 20 hours, after which light-boiling components were distilled off under reduced pressure to obtain a polymerization product of 42 g. The yield was 80%. The number average molecular weight (Mn) which was determined by a vapor pressure osmometry method was 840.

EXAMPLE 30

The same procedure as in Example 29 was repeated with the exception that the reaction temperature was 145° C. A polymerization product of 47 g was obtained. The yield was 90%. Mn=840.

EXAMPLE 31

In a 200 ml one-necked flask were charged 305 mmol (52.5 g, 50 ml) of diethyl fumarate and 50 ml of p-xylene. The flask was provided with a dropping funnel and a condenser and then put in an oil bath. While maintaining the temperature at 135° C.under stirring with a magnetic stirrer and refluxing, a solution of 35 mmol (5.8 g) of 2,2'-azobisisobutyronitrile (AIBN) in 50 ml of p-xylene was continuously added dropwise at a constant rate over 12 hours. The heating and refluxing were continued for further 12 hours, after which light-boiling components were distilled off under reduced pressure to obtain a polymerization product of 57 g. The yield was 100%. Mn=570.

EXAMPLE 32

The same procedure as in Example 31 was repeated with the exception that the amount of p-xylene was 100 ml. A polymerization product of 52 g was obtained. The yield was 100%. Mn=570.

EXAMPLE 33

The same procedure as in Example 31 was repeated with the exception that the amount of p-xylene was 200 ml. A polymerization product of 54 g was obtained. The yield was 100%. Mn=520.

EXAMPLE 34

The same procedure as in Example 31 was repeated with the exception that the amount of p-xylene was 400 ml and the heating and refluxing were continued for 19 hours after the completion of the addition of AIBN. A polymerization product of 49.1 g was obtained. The yield was 94%. Mn=440.

EXAMPLE 35

The same procedure as in Example 31 was repeated with the exception that 50 ml of o-xylene were used in place of p-xylene and the reaction temperature was 145° C. A polymerization product of 54 g was obtained. The yield was 100%.

EXAMPLE 36

The same procedure as in Example 31 was repeated with the exception that 50 ml of 2-butanone (MEK) were used in place of p-xylene and the reaction temperature was 80° C. A polymerization product of 48.8 g was obtained. The yield was 93%.

EXAMPLE 37

The same procedure as in Example 31 was repeated with the exception that 50 ml of 4-methyl-2-pentanone (MIBK) were used in place of p-xylene and the reaction temperature was 118° C. A polymerization product of 54 g was obtained. The yield was 100%.

EXAMPLE 38

The same procedure as in Example 31 was repeated with the exception that 50 ml of cyclohexanone were used in place of p-xylene and the reaction temperature was 155° C. A polymerization product of 52.5 g was obtained. The yield was 100%.

EXAMPLE 39

The same procedure as in Example 35 was repeated with the exception that 217 mmol (49.5 g) of di-n-butyl fumarate were used as a starting ester and the amount of AIBN was 27.5 mmol (4.5 g). A polymerization product of 50 g was obtained. The yield was 100%.

EXAMPLE 40

The same procedure as in Example 31 was repeated with the exception that 310 mmol (53.5 g, 50 ml) of diethyl maleate were used as a starting ester and 1.14 mmol (0.1 ml) of morpholine were further added to the reaction system initially. A polymerization product of 53 g was obtained. The yield was 100%.

COMPARATIVE EXAMPLE 30

In a 100 ml three-necked flask were charged 305 mmol (52.5 g, 50 ml) of diethyl fumarate. The flask was provided with a condenser and put in an oil bath. While maintaining the temperature at 135° C. under stirring with a magnetic stirrer and refluxing, 5 mmol (8.2 g) of 2,2'-azobisisobutyronitrile (AIBN) were added in one time. The heating and refluxing were continued for 12 hours, after which light-boiling components were distilled off under reduced pressure to obtain a polymerization product of 36 g. The yield was 68%.

COMPARATIVE EXAMPLE 31

In a 300 ml four-necked flask were charged 305 mmol (52.5 g, 50 ml) of diethyl fumarate and 250 ml of p-xylene.

The flask was provided with a condenser and put in an oil bath. While maintaining the temperature at 135° C. under stirring with a magnetic stirrer and refluxing, 50 mmol (8.2 g) of AIBN(2,2'-azobisisobutyronitrile) were added in one time. The heating and refluxing were continued for 12 hours, after which light-boiling components were distilled off under reduced pressure to obtain a polymerization product of 20.4 g. The yield was 38%.

The same procedure as in Comparative Example 30 was repeated with the exception that 250 ml of o-xylene were used in place of p-xylene and the reaction temperature was 145° C. A polymerization product of 35.5 g was obtained. The yield was 68%.

COMPARATIVE EXAMPLE 33

The same procedure as in Comparative Example 30, was repeated with the exception that 250 ml of 2-butanone (MEK) were used in place of p-xylene and the reaction temperature was 80° C. A polymerization product of 23.5 g was obtained. The yield was 45%.

COMPARATIVE EXAMPLE 34

The same procedure as in Comparative Example 30 was repeated with the exception that 250 ml of 4-methyl-2-pentanone (MIBK) were used in place of p-xylene and the reaction temperature was 118° C. A polymerization product of 14.7 g was obtained. The yield was 28%.

COMPARATIVE EXAMPLE 35

The same procedure as in Comparative Example 30 was repeated with the exception that 250 ml of cyclohexanone were used in place of p-xylene and the reaction temperature was 255° C. A polymerization product of 21.6 g was obtained. The yield was 43%.

EXAMPLE 41

In a 500 ml four-necked flask were charged 305 mmol (52.5 g) of diethyl fumarate and 400 ml of p-xylene. The flask was provided with a condenser and put in an oil bath. While maintaining the temperature at 135° C. under stirring with a magnetic stirrer and refluxing, each 5 mmol (0.82 g) of 2,2'-azobisisobutyronitrile (AIBN) were added seven times at intervals of about four hours. That is, 35 mmol in total were added over 30 hours. Light-boiling components were then distilled off under reduced pressure to obtain a polymerization product of 37.5 g. The yield was 71%.

INDUSTRIAL APPLICATION

The lubricant according to the invention may be used as a lubricant with a refrigerant in various refrigerating systems, such as air conditioners for buildings or houses, refrigerators, freezers or car air conditioners.

In addition, the lubricant according to the invention may be added as an additive to refrigerating machine lubricants comprising other materials such as organic carboxylic esters, polyalkylene glycol, alkylbenzene or mineral oils as a base oil.

An alkyl fumarate ester copolymer having the above-mentioned particular structure is preferred as a lubricant for use with a refrigerant in a refrigerating machine. It is compatible with substitute freon refrigerants such as hydrogen-containing halogenated hydrocarbons, particularly R 134a in a wide temperature range, -has a high viscosity index and is stable thermally, and chemically and excellent in lubricity.

We claim:

1. A lubricant comprising a fumaric ester polymer which comprises a recurring unit represented by the following general formula (I):

wherein $R_1$ is an ethyl group in 1 to 50 mole % of the recurring unit (I) and $R_1$ is a linear or branched $C_3$ to $C_8$ alkyl group in 50 to 99 mole % of the recurring unit (I) provided that there are at least two recurring units (I); and at least one substance selected from the group consisting of organic carboxylic esters and polyalkylene glycol, which substance has a kinematic viscosity of 2 to 30 cSt at 100° C.

2. The lubricant as claimed in claim 1, wherein the fumaric ester polymer has a kinematic viscosity in a range of from 2 to 100 cSt at 100° C.

3. The lubricant claimed in claim 1, wherein the fumaric ester polymer has a number average molecular weight of 400 to 3,000.

4. The lubricant as claimed in claim 1, wherein recurring unit (I) is composed of 5 to 45 mole % of a structural unit represented by the following formula (V) and 95 to 55 mole % of a structural unit represented by the following formula (VI) and has a molecular weight of 800 to 3,000:

5. The lubricant as claimed in claim 1, wherein the fumaric ester polymer further comprises at least one recurring unit represented by the following general formula (II):

wherein $R_2$ is selected from the group consisting of alkylene groups and substituted alkylene groups, and the number of recurring units (I) is equal to or larger than the number of recurring units (II).

6. The lubricant as claimed in claim 5, wherein the recurring unit (II) is present at up to 20 mole % of the fumaric ester polymer.

7. A composition comprising:

a hydrogen-containing halogenated hydrocarbon refrigerant; and a lubricant comprising a fumaric acid ester polymer which comprises a recurring unit represented by the following general formula (I):

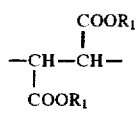

wherein $R_1$ is the same as or different from one another and is selected from the group consisting of linear or branched $C_1$ to $C_9$ alkyl groups, aryl groups and terminal-substituted or -unsubstituted polyalkylene oxide radicals, provided that there are at least two recurring units (I); and the polymer has a kinematic viscosity in the range of from 2–100 cSt at 100° C.

8. The composition of claim 7, wherein the hydrogen-containing halogenated hydrocarbon refrigerant comprises a non-chlorine halogenated hydrocarbon.

* * * * *

UNITED STATES PATENT AND TRADEMARK OFFICE
CERTIFICATE OF CORRECTION

PATENT NO. : 5,798,054
DATED : August 25, 1998
INVENTOR(S) : Takehisa Sato; Hironari Ueda; Toshiaki Kuribayashi; Satoshi Asano; Tadashi Niwa; Hiroshi Ueno; Takeaki Fuiii, Sadakatsu Suzuki, all of Saitama, Japan It is certified that error appears in the above-identified patent and that said Letters Patent is hereby corrected as shown below:

On the title page: Item [73]

please delete the Assignee "Exxon Chemical Patents Inc. Houston, Texas" and insert --Tonen Corporation, Iruma-Gun Saitama, Japan 356--.

Signed and Sealed this

Seventeenth Day of August, 1999

Attest:

Q. TODD DICKINSON

*Attesting Officer*    *Acting Commissioner of Patents and Trademarks*